(12) United States Patent
Kariyama et al.

(10) Patent No.: US 9,227,692 B2
(45) Date of Patent: Jan. 5, 2016

(54) HYDRAULIC BICYCLE COMPONENT SYSTEM

(75) Inventors: Osamu Kariyama, Osaka (JP); Masahiro Nakamura, Osaka (JP); Takahiro Yamashita, Osaka (JP)

(73) Assignee: Shimano Inc., Osaka (JP)

( * ) Notice: Subject to any disclaimer, the term of this patent is extended or adjusted under 35 U.S.C. 154(b) by 36 days.

(21) Appl. No.: 13/566,331

(22) Filed: Aug. 3, 2012

(65) Prior Publication Data

US 2014/0034428 A1 Feb. 6, 2014

(51) Int. Cl.
*B62L 3/00* (2006.01)
*B62L 3/02* (2006.01)

(52) U.S. Cl.
CPC ...................... *B62L 3/023* (2013.01)

(58) Field of Classification Search
CPC .............. B62L 1/00; B62L 1/10; B62L 1/12; B62L 1/14; B62L 1/16; B62L 1/005; B62L 3/00; B62L 3/02; B62L 3/023; B62L 3/06; B60T 11/22; B60T 11/046; B60T 7/102
USPC ....................................... 188/72.4
See application file for complete search history.

(56) References Cited

U.S. PATENT DOCUMENTS

| | | |
|---|---|---|
| 1,578,724 A | 3/1926 | Herbst et al. |
| 1,933,117 A * | 10/1933 | Markle ................ F16L 55/10 220/265 |
| 3,057,313 A | 10/1962 | Setser |
| 3,366,182 A | 1/1968 | Solum |
| 3,609,825 A | 10/1971 | Pullos |
| 3,900,223 A * | 8/1975 | Schafer ................ F16L 29/005 285/351 |
| 4,019,512 A | 4/1977 | Tenczar |
| 4,022,496 A | 5/1977 | Crissy et al. |
| 4,030,494 A | 6/1977 | Tenczar |
| 4,187,846 A | 2/1980 | Lolachi et al. |
| 4,239,313 A | 12/1980 | Parr |
| 4,256,333 A | 3/1981 | Jones |
| 4,508,367 A | 4/1985 | Oreopoulos et al. |
| 4,550,743 A | 11/1985 | McFarlane et al. |
| 4,611,828 A | 9/1986 | Brunet |
| 4,842,004 A | 6/1989 | Steinman |
| 4,846,506 A * | 7/1989 | Bocson ............... F16L 37/0987 285/27 |
| 4,977,792 A * | 12/1990 | Nagano .................. B62K 23/06 188/2 D |
| 5,012,946 A * | 5/1991 | McCarthy .............. B65D 51/20 215/232 |
| 5,119,964 A * | 6/1992 | Witt ....................... B65D 51/20 215/232 |

(Continued)

FOREIGN PATENT DOCUMENTS

| | | | |
|---|---|---|---|
| DE | 102007040293 A1 | 3/2009 | |
| FR | 2862599 A1 * | 5/2005 | ............. B62H 5/001 |

(Continued)

OTHER PUBLICATIONS

English translation of Description of FR-2862599 (May 2005).*

(Continued)

*Primary Examiner* — Anna Momper
*Assistant Examiner* — San Aung
(74) *Attorney, Agent, or Firm* — Global IP Counselors

(57) ABSTRACT

A hydraulic bicycle component system includes a hydraulic component and a first seal. The hydraulic component has a fluid path filled with hydraulic fluid. The hydraulic component is configured to be coupled to a hydraulic hose. The first seal is arranged to seal an end of the fluid path of the hydraulic component.

21 Claims, 18 Drawing Sheets

(56) References Cited

U.S. PATENT DOCUMENTS

| | | | |
|---|---|---|---|
| 5,174,611 A | 12/1992 | Byrd et al. | |
| 5,505,495 A | 4/1996 | Godeau | |
| 5,924,328 A * | 7/1999 | Okajima | B62L 3/02 |
| | | | 188/2 D |
| 6,257,267 B1 | 7/2001 | Saijo et al. | |
| 6,481,756 B1 | 11/2002 | Field et al. | |
| 6,527,303 B2 * | 3/2003 | Kariyama | B60T 1/065 |
| | | | 285/246 |
| 6,679,529 B2 | 1/2004 | Johnson et al. | |
| 6,688,440 B2 | 2/2004 | Matsushita et al. | |
| 6,874,522 B2 | 4/2005 | Anderson et al. | |
| 7,097,209 B2 | 8/2006 | Unger et al. | |
| 7,252,308 B2 | 8/2007 | Thilly | |
| 8,448,992 B2 | 5/2013 | Min et al. | |
| 2002/0030327 A1 * | 3/2002 | Florence | F16L 39/00 |
| | | | 277/606 |
| 2002/0093192 A1 | 7/2002 | Matkovich | |
| 2005/0199450 A1 * | 9/2005 | Campbell | B60T 11/22 |
| | | | 188/24.15 |
| 2008/0132876 A1 | 6/2008 | Felt | |
| 2009/0120751 A1 * | 5/2009 | Lin | B60T 7/10 |
| | | | 188/344 |
| 2009/0293735 A1 | 12/2009 | Dillen et al. | |
| 2010/0019489 A1 | 1/2010 | Takizawa | |
| 2012/0273308 A1 * | 11/2012 | Uchida | F16L 33/224 |
| | | | 188/72.4 |
| 2012/0295745 A1 | 11/2012 | Emura et al. | |

FOREIGN PATENT DOCUMENTS

| | | | |
|---|---|---|---|
| GB | 2503049 | * | 12/2013 |
| JP | 03273989 A | * | 12/1991 |
| JP | 08119177 A | * | 5/1996 |
| JP | 2001-288001 A | | 10/2001 |
| JP | 2006-183831 A | | 7/2006 |
| TW | M296841 U | | 9/2006 |
| TW | 201118004 A | | 6/2011 |
| TW | M413644 U | | 10/2011 |

OTHER PUBLICATIONS

SPX Power Team; Catalog; Non-Conductive Hoses, Prior Art to Apr. 2011.

Office Action of U.S. Appl. No. 13/566,393 dated Oct. 10, 2014.

* cited by examiner

HYDRAULIC BICYCLE COMPONENT SYSTEM

BACKGROUND

1. Field of the Invention

This invention generally relates to a hydraulic bicycle component system. More specifically, this invention relates to a hydraulic bicycle component system that is used in a hydraulic bicycle system.

2. Background Information

A hydraulic brake system is well known as an example of a bicycle hydraulic system. The hydraulic brake system for a bicycle typically has a brake lever that is fluidly coupled to a brake caliper by a hydraulic brake hose. The brake caliper is hydraulically controlled by hydraulic fluid flowing through the hydraulic brake hose in response to operation of the brake lever. In particular, operation of the brake lever forces hydraulic fluid through the hydraulic brake hose to the brake caliper. The hydraulic fluid then moves one of more pistons to cause the brake pads to squeeze a rotor that is attached to a hub of a bicycle wheel. To ensure proper operation of the hydraulic brake system or other hydraulic bicycle system, air in the hydraulic bicycle system should be removed.

SUMMARY

One aspect is to provide to a hydraulic bicycle component system that aids in avoiding air being trapped in a hydraulic bicycle system during assembly.

In view of the state of the known technology, a hydraulic bicycle component system is provided that basically includes a hydraulic component and a first seal. The hydraulic component has a fluid path filled with hydraulic fluid. The hydraulic component is configured to be coupled to a hydraulic hose. The first seal is arranged to seal an end of the fluid path of the hydraulic component.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
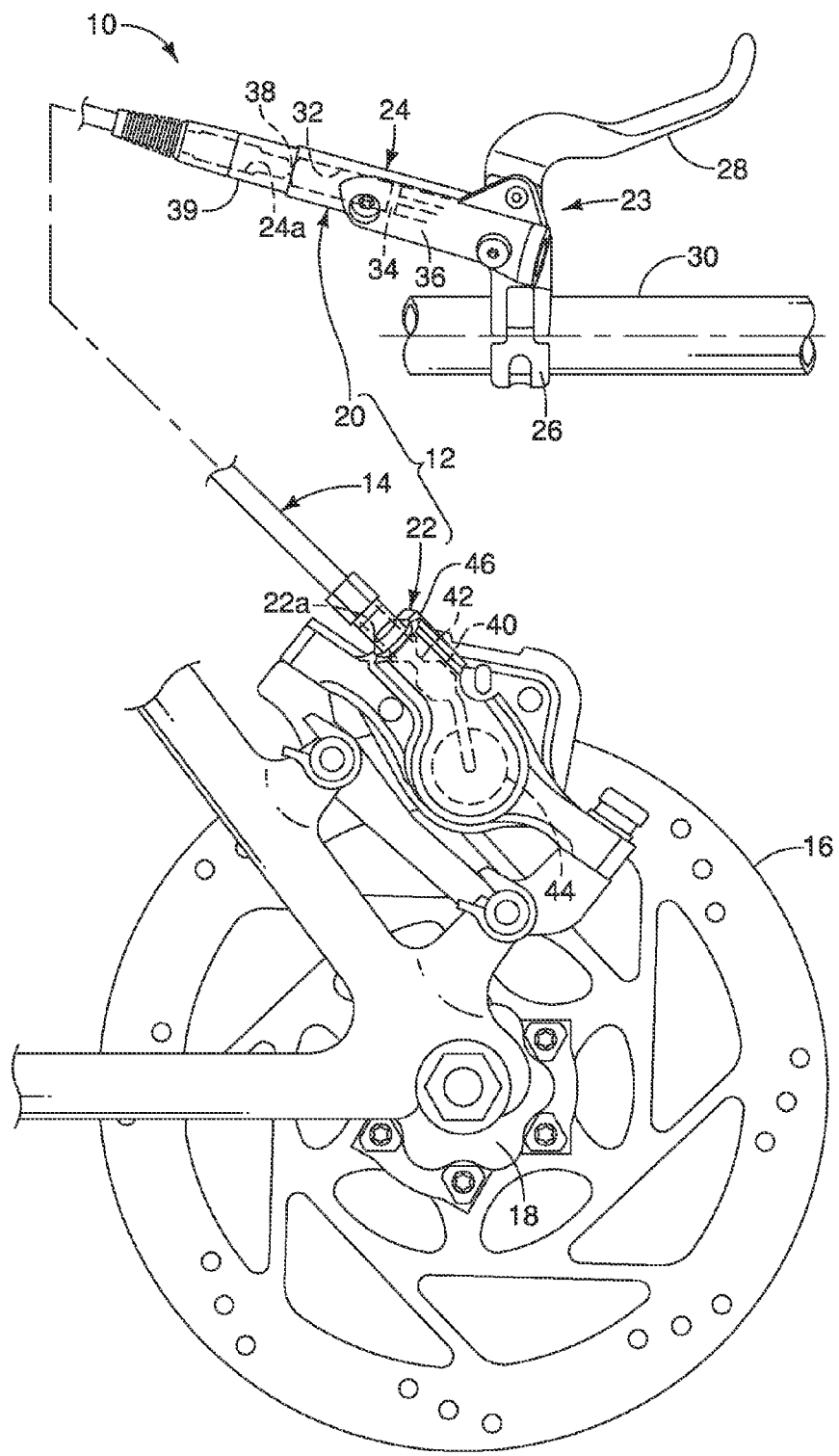
FIG. 1 is a side elevational view of a disc brake assembly using a hydraulic bicycle system with a hydraulic brake hose structure between a brake operating mechanism and a brake caliper in accordance with one embodiment.

Referring initially to FIG. 1, a disc brake assembly 10 is illustrated that includes with a hydraulic brake system 12 with a hydraulic brake hose structure 14 (e.g., a hydraulic bicycle hose structure) in accordance with one illustrated embodiment. As discussed below, the hydraulic brake hose structure 14 is prefilled with hydraulic fluid and sealed at each end so that the hydraulic brake system 12 can be assembled in a relatively easy manner without air being trapped in the hydraulic brake system 12.

While the hydraulic brake hose structure 14 is illustrated as being used with a rear disc brake assembly, the hydraulic brake hose structure 14 can also be used with a front disc brake assembly. The disc brake assembly 10 has a disc brake rotor 16 that is fixedly attached to a hub 18 of a bicycle wheel (not shown). The hydraulic brake system 12 further includes a brake operating mechanism 20 (e.g., a hydraulic component or a first hydraulic component) and a brake caliper 22 (e.g., a hydraulic component or a second hydraulic component). The caliper 22 and the brake operating mechanism 20 include conventional bicycle components that are hydraulically operated in a conventional manner, unless otherwise specified below. Since these components are conventional, they will not be discussed and/or illustrated in detail herein. Furthermore, the disc brake assembly 10 is installed to a bicycle. Bicycles and their various components are well-known in the prior art, and thus, the bicycles and its various components will not be discussed or illustrated in detail herein, except for the components of the disc brake assembly 10. In other words, only the disc brake assembly 10 will be discussed and illustrated in detail herein. Moreover, since most disc brake assemblies are well known to those skilled in the art, the disc brake assembly 10 will only be discussed and illustrated to the extent needed to understand the present disclosure.

As seen in FIG. 1, the brake operating mechanism 20 basically has a brake housing 23 with a master cylinder 24. The brake operating mechanism 20 further has a clamp 26 and a brake lever 28. The clamp 26 is integrally formed with the brake housing 23. The brake lever 28 is pivotally coupled to the brake housing 23. The brake operating mechanism 20 is supported on a handlebar 30 via the clamp 26 in a conventional manner. The brake lever 28 is pivotally coupled to the brake housing 23 for operating the caliper 22 as explained below. The master cylinder 24 defines a master cylinder bore or chamber 32 that has a piston 34 reciprocally mounted in the master cylinder bore 32. The piston 34 is biased with a compression spring disposed within the master cylinder bore 32. The master cylinder 24 also has a hydraulic fluid reservoir 36 that is in fluid communication with the master cylinder bore 32. The hydraulic fluid reservoir 36 contains the hydraulic fluid (e.g., mineral oil) which is pressurized by movement of the piston 34 in the master cylinder bore 32 in response to the pivotal movement of the brake lever 28 towards the handlebar 30. In other words, the brake lever 28 is operatively coupled to the piston 34 for moving the piston 34 between a piston rest position and a piston operating position. The master cylinder 24 has an outlet port 38 (see FIG. 2A) for supplying the hydraulic fluid to the caliper 22 via the hydraulic brake hose structure 14. Since the operations of the master cylinder 24 and the piston 34 are conventional, these parts will not be discussed or shown in further detail herein. The master cylinder 24 also has a hose attachment section 39 (e.g., an attachment portion) with an internal threaded bore 24a that is fluidly communicated with the master cylinder bore 32 via the outlet port 38.

Still referring to FIG. 1, the caliper 22 basically has an internal fluid passage 40 with an inlet port 42. A piston 44 is movably mounted in a cylinder defined by a housing of the caliper 22 by fluid pressure entering the internal fluid passage 40 in a conventional manner. The caliper 22 also has a hose attachment section 46 with an internal threaded bore 22a. The internal threaded bore 22a is fluidly communicated with the internal fluid passage 40 via the inlet port 42. The caliper 22 is hydraulically controlled by hydraulic fluid flowing through the hydraulic brake hose structure 14 in response to operation of the brake lever 28 of the brake operating mechanism 20. More specifically, when the brake lever 28 of the brake operating mechanism 20 is operated, this causes the hydraulic fluid to be pressurized and flow through the hydraulic brake hose structure 14 into the internal fluid passage 40 via the inlet port 42. In other words, operation of the brake lever 28 forces hydraulic fluid through the hydraulic brake hose structure 14 to the caliper 22. As a result of the operation of the brake lever 28, the pressure in the internal fluid passage 40 increases, and thus causes the caliper 22 to apply a braking force on the disk brake rotor 16. In particular, the hydraulic fluid then moves the piston 44 to cause the brake pads (not shown) to squeeze the disk brake rotor 16. Since the operations of the caliper 22 and the piston 44 are conventional, these parts will not be discussed or shown in further detail herein.

Figure 2A:
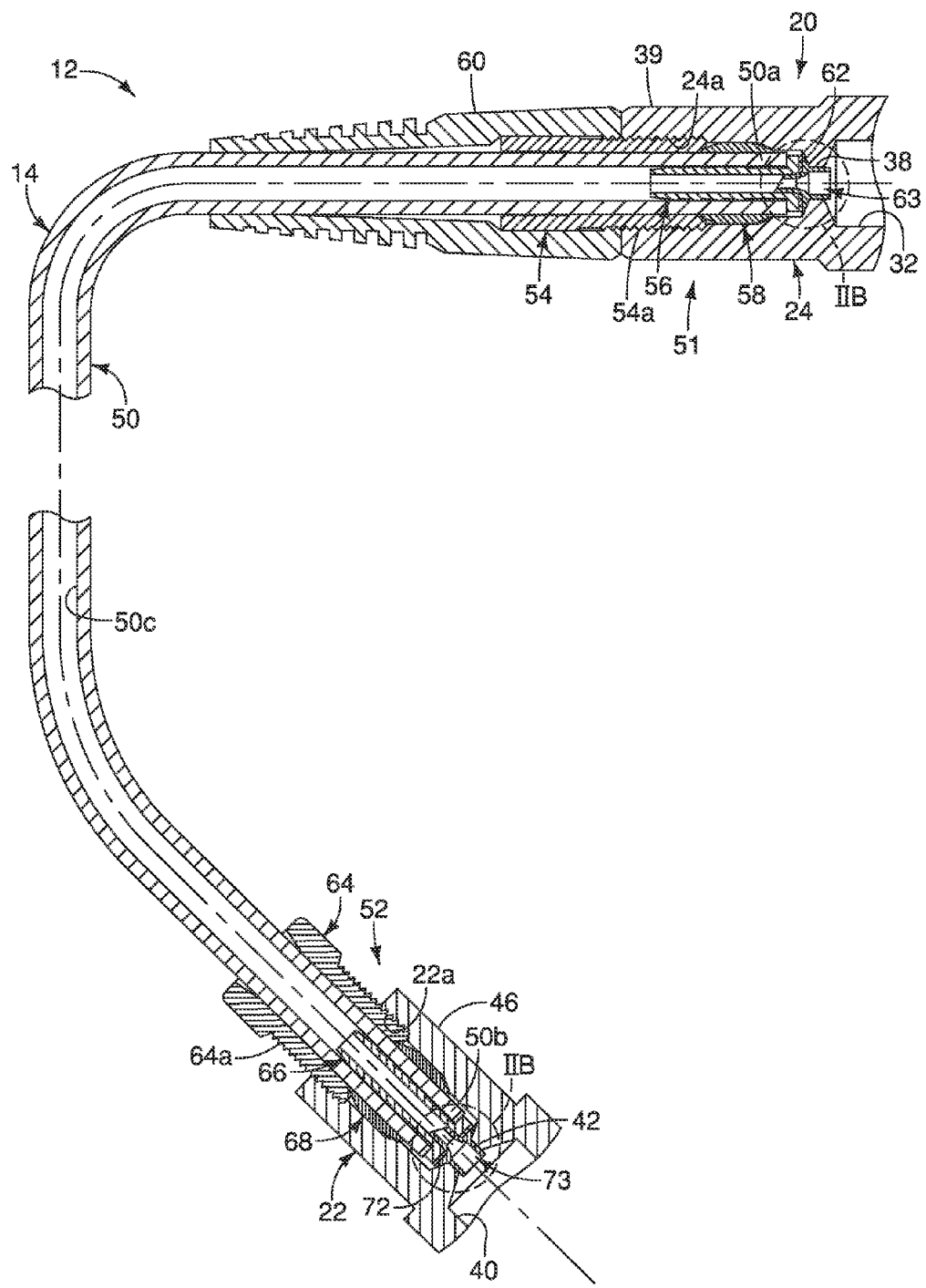
FIG. 2A is a partial cross-sectional view of the hydraulic brake hose structure illustrated in FIG. 1, with the hydraulic brake hose structure hydraulically connected to the brake operating mechanism and the brake caliper in the hydraulic brake system.
Figure 2B:
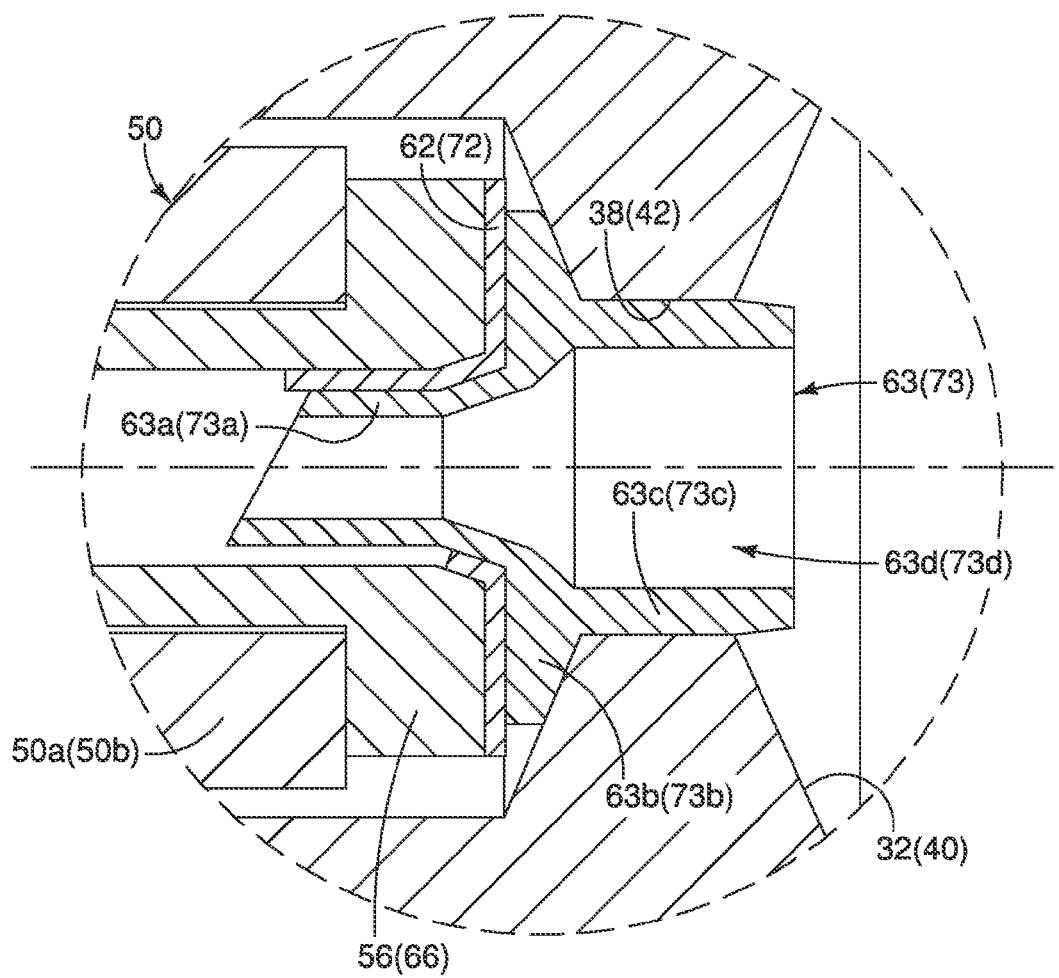
FIG. 2B is a enlarged partial cross-sectional view of encircle portions IIB in FIG. 2A.
Figure 3:
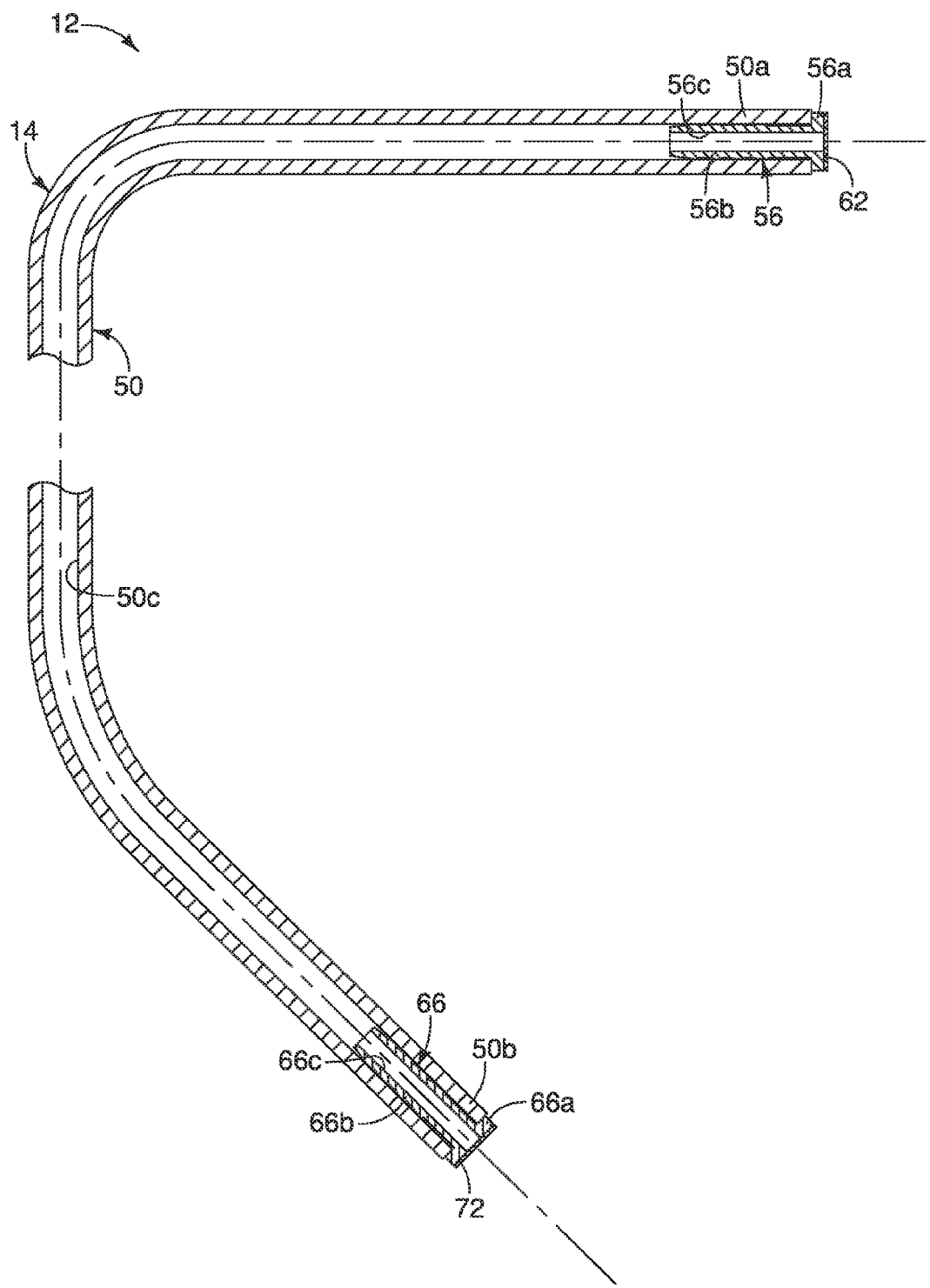
FIG. 3 is a partial cross-sectional view of the hydraulic brake hose structure illustrated in FIG. 1, with both ends of the hydraulic brake hose structure sealed with sealing materials.
Figure 4:
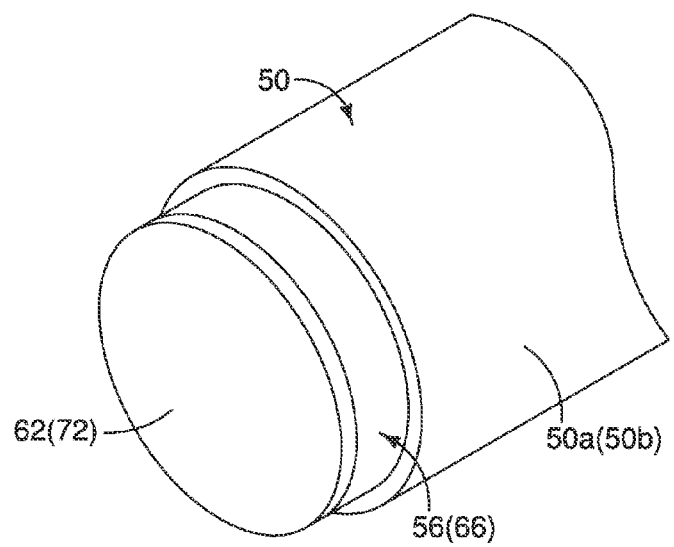
FIG. 4 is an enlarged perspective view of one end of the hydraulic brake hose structure illustrated in FIG. 3.
Figure 5:
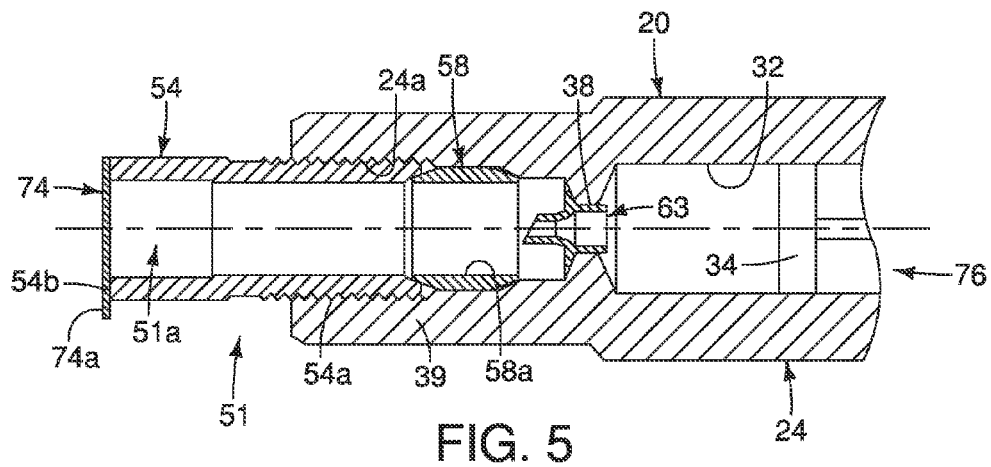
FIG. 5 is an enlarged, partial cross-sectional view of the brake operating mechanism illustrated in FIGS. 1 and 2, with a hose attachment bore of the brake operating mechanism sealed with a sealing material.
Figure 6:
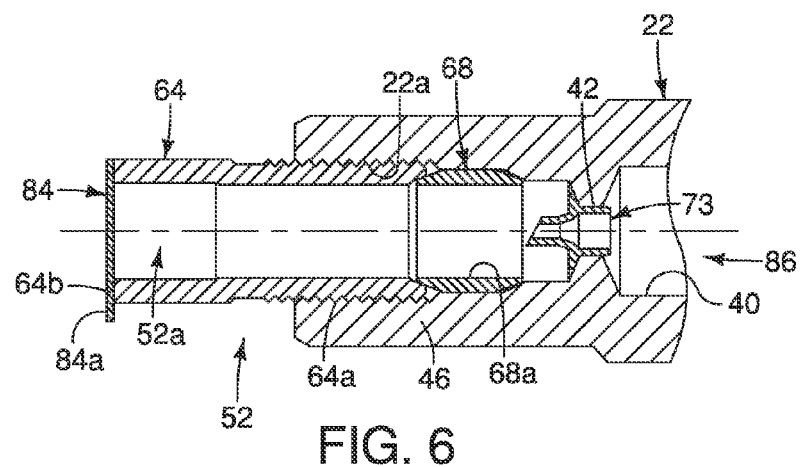
FIG. 6 is an enlarged, partial cross-sectional view of the brake caliper illustrated in FIGS. 1 and 2, with a hose attachment bore of the brake caliper sealed with a sealing material.

Referring now to FIGS. 2A to 6, the hydraulic brake system 12 will now be discussed. As seen in FIG. 2A, the caliper 22 and the master cylinder 24 are fluidly coupled together by the hydraulic brake hose structure 14. As best seen in FIGS. 3 and 4, the hydraulic brake hose structure 14 is completely prefilled with hydraulic fluid and sealed at each end prior to attachment to the caliper 22 and the master cylinder 24. Moreover, the hydraulic brake hose structure 14 is partially inserted to the caliper 22 and the master cylinder 24 in the sealed condition such that the hydraulic fluid in the hydraulic brake hose structure 14 is prevented from flowing into the caliper 22 and the master cylinder 24. Furthermore, as best seen in FIG. 2B, the hydraulic brake hose structure 14 is physically unsealed in response to the hydraulic brake hose structure 14 being fully inserted to the caliper 22 and the master cylinder 24. On the other hand, as best seen in FIGS. 5 and 6, the caliper 22 and the master cylinder 24 are completely prefilled with hydraulic fluid and sealed at ends prior to the attachment of the hydraulic brake hose structure 14. The caliper 22 and the master cylinder 24 are unsealed when the hydraulic brake hose structure 14 is attached to the caliper 22 and the master cylinder 24, respectively. Said shortly, as seen in FIGS. 3 to 6, the hydraulic brake hose structure 14, the brake operating mechanism 20 and the caliper 22 are prefilled with the hydraulic fluid and sealed with sealing materials for shipment, and then are unsealed for assembling. With the hydraulic brake hose structure 14, the caliper 22 and the master cylinder 24, the hydraulic brake system 12 can be assembled in a relatively easy manner without air being trapped in the hydraulic brake system 12.

Referring further to FIGS. 2A to 6, the hydraulic brake system 12 will now be discussed in more detail. As seen in FIG. 2A, the hydraulic brake hose structure 14 basically includes a flexible tube 50 (e.g., hydraulic hose) which forms an unfilled and unsealed hydraulic brake hose. The flexible tube 50 is a conventional flexible tube that is used for conveying hydraulic fluid from the master cylinder 24 to the caliper 22 under pressure. The hydraulic brake hose structure 14 is coupled to the master cylinder 24 with a first connector 51, and is coupled to the caliper 22 with a second connector 52. The first connector 51 is disposed over a first end portion 50a of the flexible tube 50 for attachment to the master cylinder 24 of the brake operating mechanism 20, while the second connector 52 is attached to a second end portion 50b of the flexible tube 50 for attachment to the caliper 22. The flexible tube 50 has an interior passage 50c extending between the openings of the first and second end portions 50a and 50b of the flexible tube 50.

As seen in FIGS. 2A to 5, the first connector 51 basically includes a first threaded fastening sleeve or fitting 54, a first rigid tubular insert 56 and a first tubular bushing 58. As seen in FIG. 2A, the first threaded fitting 54 is a tubular member that overlies the first end portion 50a of the flexible tube 50 while the hydraulic brake hose structure 14 is coupled to the master cylinder 24. The first threaded fitting 54 has an externally threaded portion 54a that is threaded into the internal threaded bore 24a of the master cylinder 24.

The first tubular insert 56 has an annular flange section 56a and a tubular section 56b. A longitudinal passageway 56c passes through the tubular section 56b and the flange section 56a. The outer surface of the tubular section 56b has a plurality of inclined barbs such that the tubular section 56b is securely retained in the interior passage 50c of the flexible tube 50. The first tubular insert 56 is designed to be retained in the first end portion 50a of the flexible tube 50 and to provide radial support at the first end portion 50a of the flexible tube 50. Accordingly, the first tubular insert 56 is constructed of a rigid material such as a metallic material. For example, the first tubular insert 56 can be formed of a copper or a copper alloy. Of course, any suitable rigid material can be utilized for the first tubular insert 56 as needed and/or desired.

The first tubular bushing 58 overlies the first end portion 50a of the flexible tube 50 while the hydraulic brake hose structure 14 is coupled to the master cylinder 24. The first tubular bushing 58 is designed to be deformed during installation of the first threaded fitting 54 into the internal threaded bore 24a of the master cylinder 24. In particular, the first tubular bushing 58 is compressed axially during installation of the first threaded fitting 54 into the internal threaded bore 24a of the master cylinder 24. As a result, the first tubular bushing 58 is deformed so as to squeeze the first end portion 50a of the flexible tube 50 onto the first tubular insert 56. The first tubular bushing 58 is constructed of a rigid material such as a metallic material. For example, the first tubular bushing 58 can be formed of a copper or a copper alloy. Of course, any suitable rigid material can be utilized for the first tubular bushing 58 as needed and/or desired.

As seen in FIG. 5, the first threaded fitting 54 and the first tubular bushing 58 are attached to the internal threaded bore 24a of the master cylinder 24 prior to the first end portion 50a of the flexible tube 50 being coupled to the hose attachment section 39 of the master cylinder 24. In other words, the first threaded fitting 54 and the first tubular bushing 58 define a first hose attachment bore 51a of the first connector 51 into which the first end portion 50a of the flexible tube 50 is inserted.

A flexible boot or cover 60 is optionally provided to cover the first threaded fitting 54. The cover 60 is preferably constructed of a flexible elastomeric material with good sealing properties. The cover 60 is sized to snugly engage the first end portion 50a of the flexible tube 50 and the first threaded fitting 54 for creating a watertight seal therebetween.

As seen in FIG. 3, the hydraulic brake hose structure 14 also includes a first sealing material 62 for sealing the first end portion 50a of the flexible tube 50. The first sealing material 62 forms a first seal. The first sealing material 62 is formed of a thin flexible sheet of metal foil. The first sealing material 62 is adhesively attached to the flange section 56a to overlie an opening (e.g., a first opening) of the passageway 56c. Thus, the first sealing material 62 forms a first seal that seals the first opening of the first end of the hydraulic hose. In other words, in the illustrated embodiment, the opening in the flange section 56a of the first tubular insert 56 forms the first opening of the first end of the hydraulic hose.

As further seen in FIGS. 2A and 2B, the first sealing material 62 is constructed to be ruptured or punctured with a tubular rupturing insert 63 (e.g., a first seal rupturing structure or a part of the first hydraulic component). In particular, the first sealing material 62 is physically ruptured by the rupturing insert 63 in response to the first end portion 50a of the flexible tube 50 being fully inserted to the hose attachment section 39 of the master cylinder 24. The construction of the rupturing insert 63 will be discussed in detail later.

Referring to FIGS. 2A and 2B, the first sealing material 62 prevents fluid communication between the master cylinder 24 and the passageway 56c of the first tubular insert 56 until the first sealing material 62 is ruptured by the rupturing insert 63. On the other hand, in response to fully inserting the first end portion 50a of the flexible tube 50 into the internal threaded bore 24a of the master cylinder 24 (or the hose attachment bore 51a of the first connector 51), the first sealing material 62 can be easily ruptured by the rupturing insert 63.

As seen in FIGS. 2A, 2B and 5, the rupturing insert 63 has a tubular end section 63a, an annular flange section 63b, and a tubular body section 63c. A longitudinal passageway 63d passes through the end section 63a, the flange section 63b, and the body section 63c. The rupturing insert 63 is coupled to the outlet port 38 of the master cylinder 24 such that the longitudinal passageway 63d is fluidly communicated with the master cylinder bore 32 of the master cylinder 24 to define a first fluid path of the master cylinder 24. In other words, the rupturing insert 63 (e.g., a first seal rupturing structure) is disposed in the vicinity of the first fluid path, more specifically, on a leading edge of the first fluid path of the master cylinder 24.

The end section 63a is formed as a needle for rupturing or puncturing the first sealing material 62 of the hydraulic brake hose structure 14. In particular, the end section 63a has a beveled distal end that punctures the first sealing material 62 and is inserted into the passageway 56c of the first tubular insert 56 in response to the first end portion 50a of the flexible tube 50 being coupled to the internal threaded bore 24a of the master cylinder 24. In other words, the end section 63a is dimensioned such that the end section 63a is fittedly inserted into the passageway 56c of the first tubular insert 56. The flange section 63b is rested on an annular inner end face of the internal threaded bore 24a of the master cylinder 24. When the first end portion 50a of the flexible tube 50 is coupled to the master cylinder 24, the flange section 63b is pushed against the annular inner end face of the internal threaded bore 24a of the master cylinder 24, which securely retains the rupturing insert 63 relative to the outlet port 38. The outer surface of the body section 63c is fitted to the inner surface of the outlet port 38. The body section 63c is designed to be retained in the outlet port 38. The rupturing insert 63 is constructed of a resin material such as a plastic. Of course, any suitable rigid material can be utilized for the rupturing insert 63 as needed and/or desired.

As seen in FIGS. 2A to 3 and 6, the second connector 52 includes a second threaded fastening sleeve or fitting 64, a second rigid tubular insert 66 and a second tubular bushing 68. As seen in FIG. 2A, the second threaded fitting 64 is a tubular member that overlies the second end portion 50b of the flexible tube 50 while the hydraulic brake hose structure 14 is coupled to the caliper 22. The second threaded fitting 64 has an externally threaded portion 64a that is threaded into the internal threaded bore 22a of the caliper 22.

The second tubular insert 66 has an annular flange section 66a and a tubular section 66b. A longitudinal passageway 66c passes through the tubular section 66b and the flange section 66a. The outer surface of the tubular section 66b has a plurality of inclined barbs such that the tubular section 66b is securely retained in the interior passage 50c of the flexible tube 50. The second tubular insert 66 is designed to be retained in the second end portion 50b of the flexible tube 50 and to provide radial support at the second end portion 50b of the flexible tube 50. Accordingly, the second tubular insert 66 is constructed of a rigid material such as a metallic material. For example, the second tubular insert 66 can be formed of a copper or a copper alloy. Of course, any suitable rigid material can be utilized for the second tubular insert 66 as needed and/or desired.

The second tubular bushing 68 overlies the second end portion 50b of the flexible tube 50 while the hydraulic brake hose structure 14 is coupled to the caliper 22. The second tubular bushing 68 is designed to be deformed during installation of the second threaded fitting 64 into the internal threaded bore 22a of the caliper 22. In particular, the second tubular bushing 68 is compressed axially during installation of the second threaded fitting 64 into the internal threaded bore 22a of the caliper 22. As a result, the second tubular bushing 68 is deformed so as to squeeze the second end portion 50b of the flexible tube 50 onto the second tubular insert 66. The second tubular bushing 68 is constructed of a rigid material such as a metallic material. For example, the second tubular bushing 68 can be formed of a copper or a copper alloy. Of course, any suitable rigid material can be utilized for the second tubular bushing 68 as needed and/or desired.

As seen in FIG. 6, the second threaded fitting 64 and the second tubular bushing 68 are attached to the internal threaded bore 22a of the caliper 22 prior to the second end portion 50b of the flexible tube 50 being coupled to the hose attachment section 46 of the caliper 22. In other words, the second threaded fitting 64 and the second tubular bushing 68 define a second hose attachment bore 52a of the second connector 52 into which the second end portion 50b of the flexible tube 50 is inserted.

As seen in FIG. 3, the hydraulic brake hose structure 14 also includes a second sealing material 72 for sealing the second end portion 50b of the flexible tube 50. The second sealing material 72 forms a second seal. The second sealing material 72 is a formed of a thin flexible sheet of metal foil. The second sealing material 72 is adhesively attached to the flange section 66a to overlie an opening (e.g., a second opening) of the passageway 66c. Thus, the second sealing material 72 forms a second seal that seals the second opening of the second end of the hydraulic hose. In other words, in the illustrated embodiment, the opening in the flange section 66a of the second tubular insert 66 forms the second opening of the second end of the hydraulic hose.

As further seen in FIGS. 2A and 2B, the second sealing material 72 is constructed to be ruptured or punctured with a tubular rupturing insert 73 (e.g., a second seal rupturing structure or a part of the second hydraulic component). In particular, the second sealing material 72 is physically ruptured by the rupturing insert 73 in response to the second end portion 50b of the flexible tube 50 being fully inserted to the hose attachment section 46 of the caliper 22. The construction of the rupturing insert 73 will be discussed in detail later.

Referring to FIGS. 2A and 2B, the second sealing material 72 prevents fluid communication between the caliper 22 and the passageway 66c of the second tubular insert 66 until the second sealing material 72 is ruptured by the rupturing insert 73. On the other hand, in response to fully inserting the second end portion 50b of the flexible tube 50 into the internal threaded bore 22a of the caliper 22 (or the hose attachment bore 52a of the second connector 52), the second sealing material 72 can be easily ruptured by the rupturing insert 73.

As seen in FIGS. 2A, 2B and 6, the rupturing insert 73 has a tubular end section 73a, an annular flange section 73b, and a tubular body section 73c. The rupturing insert 73 can be substantially identical to the rupturing insert 63, except for the rupturing insert 73 being dimensioned to be attached to the inlet port 42 of the caliper 22. A longitudinal passageway 73d passes through the end section 73a, the flange section 73b, and the body section 73c. The rupturing insert 73 is coupled to the inlet port 42 of the caliper 22 such that the longitudinal passageway 73d is fluidly communicated with the internal fluid passage 40 of the caliper 22 to define a second fluid path of the caliper 22. In other words, the rupturing insert 73 (e.g., a second seal rupturing structure) is disposed in the vicinity of the second fluid path, more specifically, on a leading edge of the second fluid path of the caliper 22. The second fluid path of the caliper 22 is hydraulically connected with the first fluid path of the master cylinder 24.

The end section 73a is formed as a needle for rupturing or puncturing the second sealing material 72 of the hydraulic brake hose structure 14. In particular, the end section 73a has a beveled distal end that punctures the second sealing material 72 and is inserted into the passageway 66c of the second tubular insert 66 in response to the second end portion 50b of the flexible tube 50 being coupled to the internal threaded bore 22a of the caliper 22. In other words, the end section 73a is dimensioned such that the end section 73a is fittedly inserted into the passageway 66c of the second tubular insert 66. The flange section 73b is rested on an annular inner end face of the internal threaded bore 22a of the caliper 22. When the second end portion 50b of the flexible tube 50 is coupled to the caliper 22, the flange section 73b is pushed against the annular inner end face of the internal threaded bore 22a of the caliper 22, which securely retains the rupturing insert 73 relative to the inlet port 42. The outer surface of the body section 73c is fitted to the inner surface of the inlet port 42. The body section 73c is designed to be retained in the inlet port 42. The rupturing insert 73 is constructed of a resin material such as a plastic. Of course, any suitable rigid material can be utilized for the rupturing insert 73 as needed and/or desired.

As seen in FIGS. 3 and 4, the hydraulic brake hose structure 14 is prefilled with hydraulic fluid and sealed at opposite ends by the first and second sealing materials 62 and 72. Preferably, the hydraulic brake hose structure 14 is free of any air or other gas between the first and second sealing materials 62 and 72. In particular, the hydraulic brake hose structure 14 is prefilled with hydraulic fluid and sealed at opposite ends while shipping until the hydraulic brake hose structure 14 is coupled to the caliper 22 and the master cylinder 24.

As seen in FIG. 5, the master cylinder 24 is prefilled with hydraulic fluid and sealed at an end by a third sealing material 74 (e.g., a first seal or a third seal). Preferably, the master cylinder 24 is free of any air or other gas within a hydraulic fluid retaining area 76 (e.g., a fluid path or a first fluid path) of the master cylinder 24. The hydraulic fluid retaining area 76 is defined by the master cylinder bore 32, the hydraulic fluid reservoir 36, the outlet port 38 and the hose attachment bore 51a. The end of the hydraulic fluid retaining area 76 is sealed by the third sealing material 74. In other words, the hydraulic fluid retaining area 76 is partially defined by the first threaded fitting 54 (e.g., a hydraulic hose connection end) that is sealed by the third sealing material 74. The hydraulic fluid retaining area 76 of the master cylinder 24 is prefilled with hydraulic fluid and sealed at the end by the third sealing material 74 while shipping until the hydraulic brake hose structure 14 is coupled to the master cylinder 24.

As further seen in FIG. 5, the third sealing material 74 seals an end opening of the first threaded fitting 54 that has been attached to the internal threaded bore 24a of the master cylinder 24. The third sealing material 74 forms a third seal. The third sealing material 74 is formed of a thin flexible sheet of metal foil. The third sealing material 74 is a strippable sheet. Specifically, the third sealing material 74 is removably or strippably attached to an annular end face 54b of the first threaded fitting 54 to overlie the opening of the hose attachment bore 51a that is defined by the annular end face 54b. In particular, third sealing material 74 is thermally bonded to the first threaded fitting 54. The third sealing material 74 has a stripping tab 74a that is held for removing the third sealing material 74 from the first threaded fitting 54. The stripping tab 74a extends outward relative to an outer periphery of the first threaded fitting 54. In the illustrated embodiment, the third sealing material 74 forms a first seal that seals an end of the fluid path of the hydraulic component. In other words, in the illustrated embodiment, the opening in the first threaded fitting 54 forms an end of the fluid path of the hydraulic component.

As seen in FIG. 6, the caliper 22 is prefilled with hydraulic fluid and sealed at an end by a fourth sealing material 84 (e.g., a first seal or a fourth seal). Preferably, the caliper 22 is free of any air or other gas within a hydraulic fluid retaining area 86 (e.g., a fluid path or a second fluid path) of the caliper 22. The hydraulic fluid retaining area 86 is defined by the internal fluid passage 40, the inlet port 42 and the hose attachment bore 52a. The end of the hydraulic fluid retaining area 86 is sealed by the fourth sealing material 84. In other words, the hydraulic fluid retaining area 86 is partially defined by the second threaded fitting 64 (e.g., a hydraulic hose connection end) that is sealed by the fourth sealing material 84. In particular, the hydraulic fluid retaining area 86 of the caliper 22 is prefilled with hydraulic fluid and sealed at the end by the fourth sealing material 84 while shipping until the hydraulic brake hose structure 14 is coupled to the caliper 22.

As further seen in FIG. 6, the fourth sealing material 84 seals an end opening of the second threaded fitting 64 that has been attached to the internal threaded bore 22a of the caliper 22. The fourth sealing material 84 forms a fourth seal. The fourth sealing material 84 is formed of a thin flexible sheet of metal foil. The fourth sealing material 84 is a strippable sheet. Specifically, the fourth sealing material 84 is removably or strippably attached to an outside end face 64b of the second threaded fitting 64 to overlie the opening of the hose attachment bore 52a. In particular, the fourth sealing material 84 is thermally bonded to the second threaded fitting 64. The fourth sealing material 84 has a stripping tab 84a that is held for removing the fourth sealing material 84 from the second threaded fitting 64. The stripping tab 84a extends outward relative to an outer periphery of the second threaded fitting 64. In the illustrated embodiment, the fourth sealing material 84 forms a second seal that seals an end of the fluid path of the hydraulic component. In other words, in the illustrated embodiment, the opening in the second threaded fitting 64 forms an end of the fluid path of the hydraulic component.

Now, a method of assembly of each of the components of the hydraulic brake system 12, and a method of assembly of the hydraulic brake system 12 will be discussed in which the hydraulic brake system 12 can be assembled in a relatively easy manner without air being trapped in the hydraulic brake system 12. Unless otherwise specified, the following method of assembling the hydraulic brake system 12 can be performed in a different order than discussed herein. In other words, the method of assembling the hydraulic brake system 12 is not limited to the following described order of assembly unless otherwise specified. As seen in FIG. 3, in the illustrated embodiment, the flexible tube 50 is completely filled with hydraulic fluid and the opposite ends of the flexible tube 50 are sealed. In particular, the first and second sealing materials 62 and 72 are attached to the flange sections 56a and 66a of the first and second tubular inserts 56 and 66 after the flexible tube 50 is completely filled with hydraulic fluid. In this way, the first and second sealing materials 62 and 72 cover and seal the first and second openings of the first and second ends of the hydraulic brake hose for confining the hydraulic fluid within the flexible tube 50.

Figure 7:
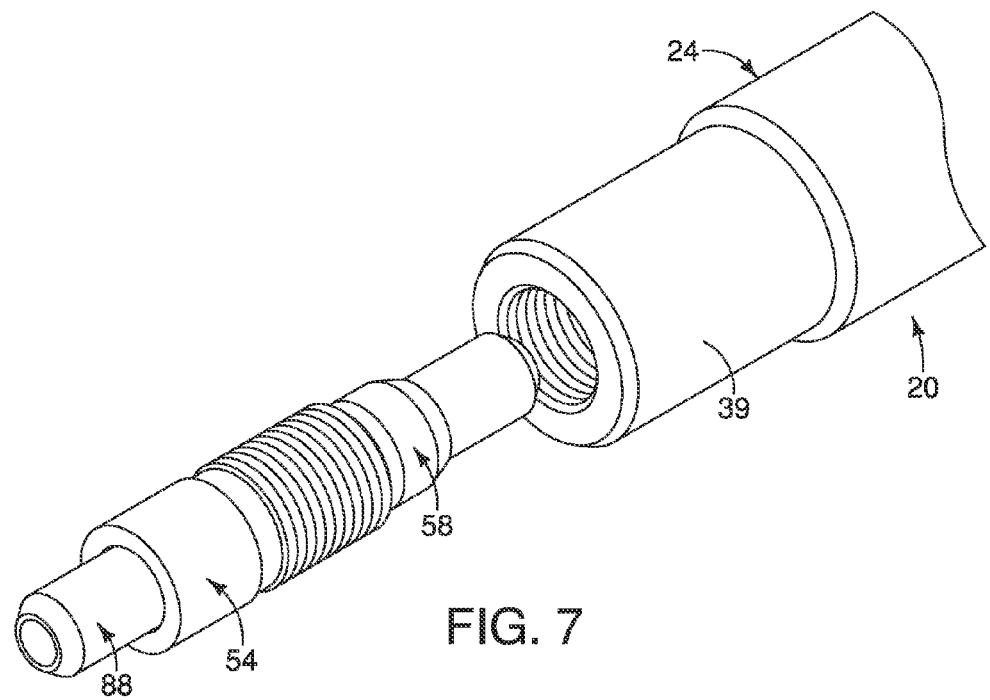
FIG. 7 is a partial perspective view of the brake operating mechanism, illustrating a threaded fitting and a tubular bushing attached to an assembling jig for assembly.
Figure 8:
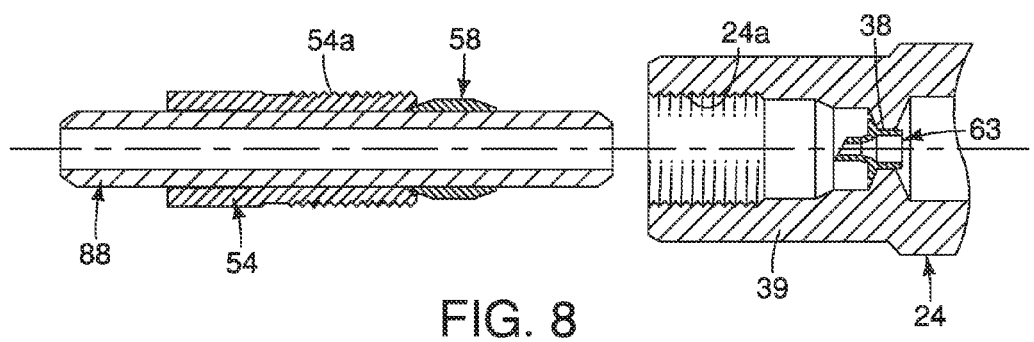
FIG. 8 is a partial cross-sectional view of the brake operating mechanism, illustrating the threaded fitting and the tubular bushing attached to the assembling jig for assembly.

Furthermore, as seen in FIG. 5, the master cylinder 24 filled with hydraulic fluid is provided. Also, as seen in FIG. 6, the caliper 22 filled with hydraulic fluid is provided. Referring to FIGS. 7 to 11, a method for providing the master cylinder 24 that is filled with hydraulic fluid will be discussed in detail. First, as seen in FIGS. 7 and 8, the first threaded fitting 54 and the first tubular bushing 58 are axially placed on a tubular assembling jig 88. The assembling jig 88 has about the same diameter as or slightly larger diameter than the flexible tube 50. The assembling jig 88 is constructed of a rigid material such as a resin material. Of course, any suitable material can be utilized for the assembling jig 88 for supporting the first threaded fitting 54 and the first tubular bushing 58 as needed and/or desired. Furthermore, the rupturing insert 63 is attached to the outlet port 38 of the master cylinder 24. Then, the first threaded fitting 54 and the first tubular bushing 58 are placed and positioned relative to the hose attachment section 39 of the master cylinder 24 with the assembling jig 88. In particular, the assembling jig 88 is inserted into the hose attachment section 39 of the master cylinder 24 such that the assembling jig 88 is concentrically arranged relative to the hose attachment section 39 of the master cylinder 24. With this assembly method, before placing the first threaded fitting 54 and the first tubular bushing 58 into the hose attachment section 39 of the master cylinder 24, the first threaded fitting 54 and the first tubular bushing 58 is placed on the assembling jig 88. Thus, all the parts of the master cylinder 24 can be properly assembled without missing any parts of the master cylinder 24.

Figure 9:
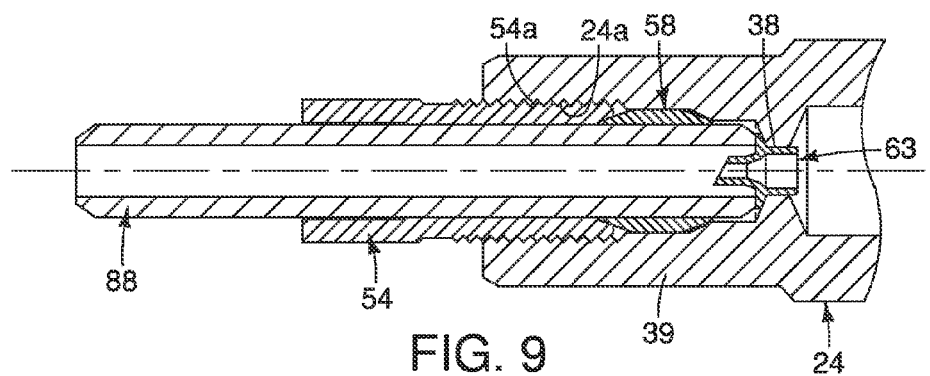
FIG. 9 is a partial cross-sectional view of the brake operating mechanism, illustrating the assembling jig with the threaded fitting and the tubular bushing inserted to a hose attachment section.

Next, as seen in FIG. 9, the first threaded fitting 54 is fastened to the hose attachment section 39 of the master cylinder 24 with guidance of the assembling jig 88. In particular, the threaded portion 54a of the first threaded fitting 54 is threaded into the internal threaded bore 24a of the master cylinder 24 with a predetermined tightening torque (e.g., a first predetermined fastening force). This predetermined tightening torque is smaller than a final tightening torque (e.g., a second predetermined fastening force) that is applied to the first threaded fitting 54 for securely coupling the first end portion 50a of the flexible tube 50 to the hose attachment section 39 of the master cylinder 24 by deforming the first tubular bushing 58. More specifically, with this predetermined tightening torque, the first tubular bushing 58 is slightly deformed such that an elastic deformation or a plastic deformation occurs on the first tubular bushing 58. After this slight deformation of the first tubular bushing 58, a hose connecting hole 58a of the first tubular bushing 58 still has an inner diameter such that the first end portion 50a of the flexible tube 50 can be inserted through the hose connecting hole 58a of the first tubular bushing 58. More specifically, after this deformation, the first tubular bushing 58 still has an inner diameter that is equal to or larger than the diameter of the first end portion 50a of the flexible tube 50. With this deformation, the first tubular bushing 58 axially presses the first threaded fitting 54 away from the first tubular bushing 58. Thus, although the first threaded fitting 54 is fastened to the hose attachment section 39 of the master cylinder 24 with the predetermined tightening torque smaller than the final tightening torque, the first threaded fitting 54 is securely coupled to the hose attachment section 39 of the master cylinder 24 without any loose. In this illustrated embodiment, before the first threaded fitting 54 is fastened to the hose attachment section 39 of the master cylinder 24, liquid gasket or other sealing materials is applied between the threaded portion 54a of the first threaded fitting 54 and the internal threaded bore 24a of the master cylinder 24 for preventing leakage of the hydraulic fluid between the threaded portion 54a of the first threaded fitting 54 and the internal threaded bore 24a of the master cylinder 24.

Figure 10:
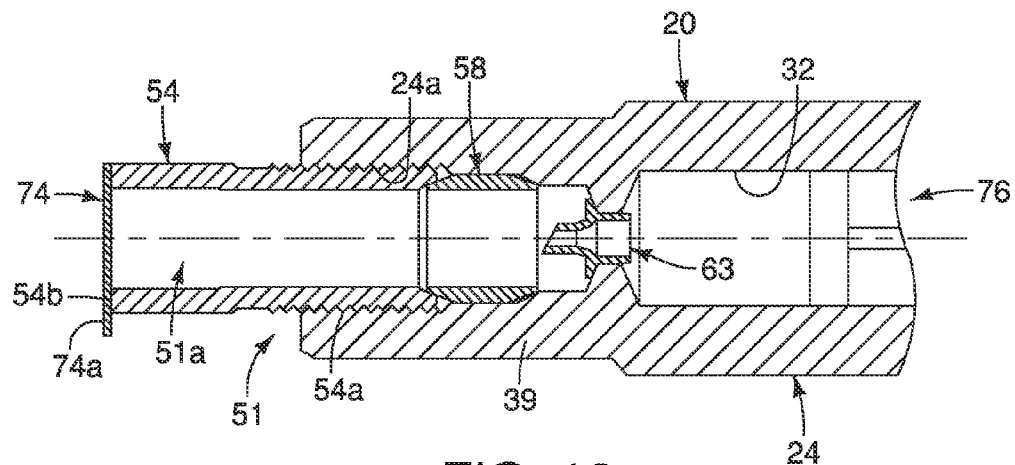
FIG. 10 is a partial cross-sectional view of the brake operating mechanism, illustrating an end of the threaded fitting that has been coupled to the hose attachment section sealed with a sealing material.

Next, as illustrated in FIG. 10, the assembling jig 88 is removed from the hose attachment bore 511a. Furthermore, the opening of the hose attachment bore 51a is sealed with the third sealing material 74. The third sealing material 74 is thermally bonded to the annular end face 54b of the first threaded fitting 54 to form the enclosed or sealed hydraulic fluid retaining area 76 of the master cylinder 24. Next, the hydraulic fluid retaining area 76 of the master cylinder 24 is filled with hydraulic fluid. The hydraulic fluid is poured into the enclosed hydraulic fluid retaining area 76 through an oil port of the hydraulic fluid reservoir 36 (see FIG. 1) of the master cylinder 24, for example. Then, a bleed screw with an O-ring is threadedly coupled to the oil port of the hydraulic fluid reservoir 36.

With this assembling method, the master cylinder 24 can be filled with hydraulic fluid and sealed. Since the master cylinder 24 is filled with hydraulic fluid, less effort is necessary to fill hydraulic fluid while hydraulically connecting the master cylinder 24 to the hydraulic brake hose structure 14. Thus, the hydraulic brake system 12 can be assembled in a relatively easy manner without air being trapped in the hydraulic brake system 12.

The caliper 22 can also be assembled with the second threaded fitting 64 and the second tubular bushing 68 with the assembling jig 88, sealed with the fourth sealing material 84, and filled with hydraulic fluid in the same matter described through reference to FIGS. 7 to 11 for the master cylinder 24. Since the method of assembling of the caliper 22 is apparent from the disclosure for the master cylinder 24, the detailed description of the steps of assembling of the caliper 22 is omitted for the sake of brevity. As a result, the hydraulic brake hose structure 14, the caliper 22 and the master cylinder 24 are independently filled with hydraulic fluid and sealed. These components form a hydraulic brake kit (e.g., hydraulic component kit).

Figure 11:
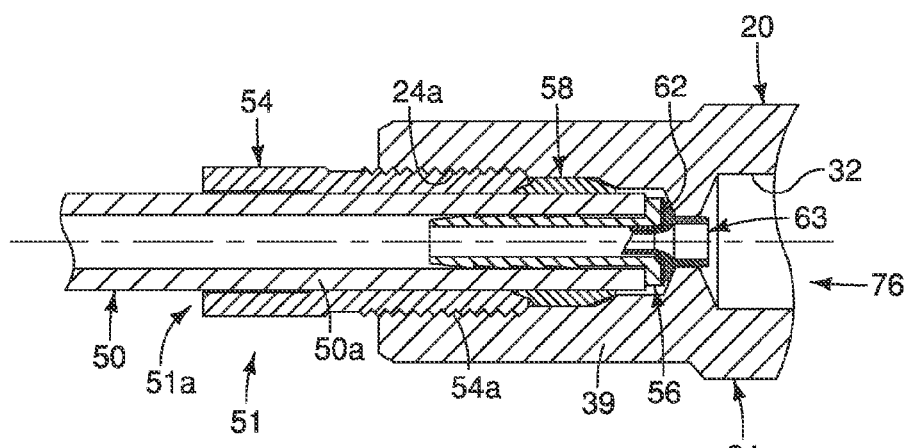
FIG. 11 is a partial cross-sectional view of the brake operating mechanism, with the brake operating mechanism coupled to the hydraulic brake hose structure.

Next, the hydraulic brake hose structure 14 is hydraulically connected to the caliper 22 and the master cylinder 24. Referring to FIG. 11, a method of assembling the hydraulic brake hose structure 14 with the master cylinder 24 will be described in detail. The caliper 22 can also be assembled with the hydraulic brake hose structure 14 in the same manner described through reference to FIG. 11 for the master cylinder 24. Thus, the detailed description of the steps of assembling of the caliper 22 with the hydraulic brake hose structure 14 will be omitted for the sake of brevity.

As seen in FIG. 11, the third sealing material 74 is removed or stripped from the first threaded fitting 54 to unseal the master cylinder 24 illustrated in FIG. 10. In particular, the stripping tab 74a is held and pulled for removing the third sealing material 74 from the first threaded fitting 54. Then, the hydraulic brake hose structure 14 illustrated in FIG. 3 is coupled to the master cylinder 24. In particular, the first end portion 50a of the flexible tube 50 is inserted into the hose attachment bore 51a such that the flexible tube 50 extends through the first threaded fitting 54 and the first tubular bushing 58. In response to this insertion, the rupturing insert 63 ruptures or punctures the first sealing material 62, which fluidly connects the interior passage 50c of the flexible tube 50 to the first fluid path of the master cylinder 24. The first end portion 50a of the flexible tube 50 is inserted to the hose attachment bore 51a until the first sealing material 62 is ruptured by the rupturing insert 63 and the flange section 56a of the first tubular insert 56 is axially pushed against the annular flange section 63b of the rupturing insert 63. Thus, the rupturing insert 63 is securely sandwiched between the first tubular insert 56 and the annular inner end face of the internal threaded bore 24a of the master cylinder 24.

Furthermore, the first threaded fitting 54 is fastened with the final tightening torque, which axially compresses the first tubular bushing 58. As a result, the first tubular bushing 58 is deformed so as to squeeze the first end portion 50a of the flexible tube 50 onto the first tubular insert 56, thereby securely coupling the first end portion 50a of the flexible tube 50 to the hose attachment section 39 of the master cylinder 24. As mentioned above, the second end portion 50b of the flexible tube 50 can also be coupled to the hose attachment section 46 of the caliper 22 in the same manner. As a result, the fluid path of the master cylinder 24 (e.g., a hydraulic component) is operatively coupled to the fluid path of the caliper 22 (e.g., an additional hydraulic component).

Figure 12:
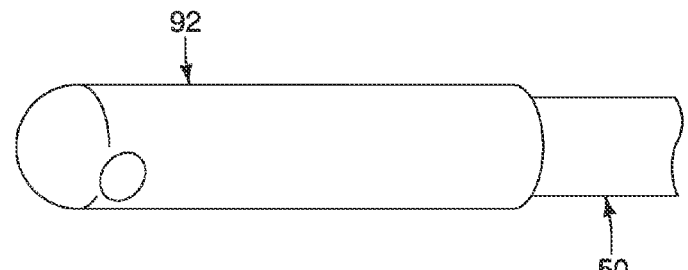
FIG. 12 is a partial perspective view of the hydraulic brake hose structure illustrated in FIG. 3, with a protective cap coupled to one end of the hydraulic brake hose structure.
Figure 13:
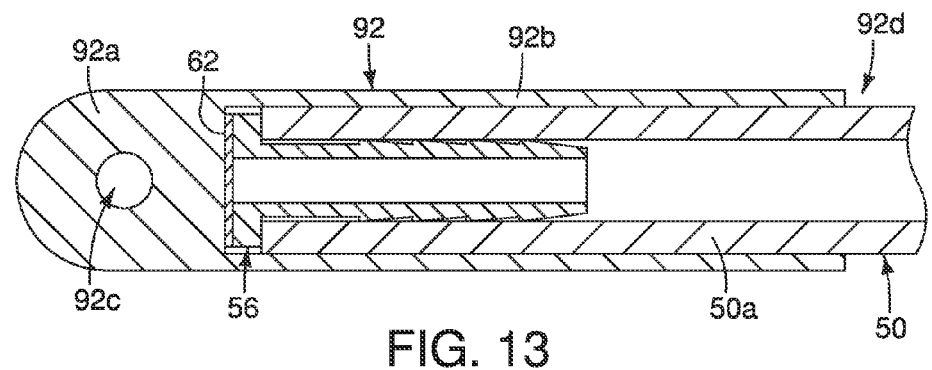
FIG. 13 is a partial cross-sectional view of the hydraulic brake hose structure illustrated in FIG. 12, with the protective cap coupled to one end of the hydraulic brake hose structure.
Figure 14:
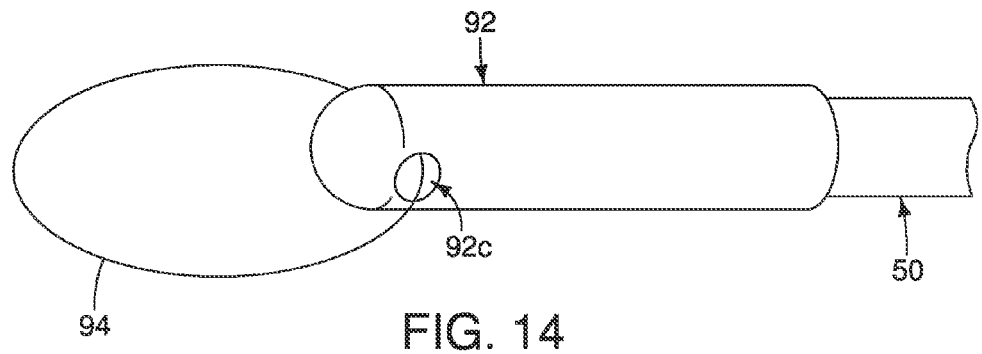
FIG. 14 is a partial perspective view of the hydraulic brake hose structure illustrated in FIG. 12, with a cord attached to the protective cap.

Referring to FIGS. 12 to 14, a protective or protection cap 92 (e.g., a first protective cap) for protecting the seals (e.g., first and second seal) of the hydraulic brake hose structure 14 will be described. The protective cap 92 is arranged to protect the first end portion 50a that is sealed by the first sealing material 62. Of course, the protective cap 92 can also be used for the second end portion 50b that is sealed by the second sealing material 72. Since the constructions of the first and second end portions 50a and 50b are identical to each other, the detailed description of the protective cap 92 used for the second end portion 50b will be omitted for the sake of brevity.

As best seen in FIG. 13, the protective cap 92 is removably attached to the first end portion 50a such that the protective cap 92 accommodates the first end portion 50a, the first tubular insert 56 and the first sealing material 62 therein. The protective cap 92 is constructed of a resin material such as a plastic, or an elastic material such as a rubber, such that the first end portion 50a of the flexible tube 50, which is made of a rubber, is fittedly coupled to the protective cap 92. Of course, any suitable material can be utilized for the protective cap 92 as needed and/or desired. The protective cap 92 has a convex or spherical head portion 92a (e.g., a spherical head) and a bottomed cylindrical portion 92b arranged with respect to the head portion 92a. The head portion 92a forms a distal end of the protective cap 92. The head portion 92a has a traverse through hole 92c (e.g., a through hole) that radially extends through the head portion 92a. As seen in FIG. 14, the through hole 92c forms a cord attachment portion for attaching a ring cord or strap 94 to the protective cap 92. The cylindrical portion 92b defines a cylindrical inner face or bore 92d within which the first end portion 50a of the flexible tube 50 with the first sealing material 62 is disposed. The protective cap 92 is integrally formed as a one-piece, unitary member.

As seen in FIG. 13, the hydraulic brake hose structure 14 is prefilled with hydraulic fluid and sealed for shipment (see also FIG. 3). With the protective cap 92, the first and second sealing materials 62 and 72 are prevented from being ruptured during shipment due to contacting with external objects, thereby preventing oil leakage from the hydraulic brake hose structure 14 during shipment. Furthermore, with the protective cap 92, the first and second sealing materials 62 and 72 are prevented from being ruptured during installation of the hydraulic brake hose structure 14 through an interior of a bicycle frame body (not shown). Specifically, while installing the hydraulic brake hose structure 14 to the bicycle frame body, the first end portion 50a (or the second end portion 50b) with the protective cap 92 is introduced into the interior of the bicycle frame body via an entrance through-hole formed in the bicycle frame body. Then, the first end portion 50a (or the second end portion 50b) with the protective cap 92 is guided along an interior surface of the bicycle frame body. Since the protective cap 92 has the convex or spherical head portion 92a, the first end portion 50a (or the second end portion 50b) with the protective cap 92 can be smoothly guided along the interior surface of the bicycle frame body during the installation. Furthermore, with the protective cap 92, the first sealing material 62 (or the second sealing material 72) is prevented from being ruptured due to contacting interior objects within the bicycle frame body, thereby preventing oil leakage from the hydraulic brake hose structure 14 during the installation. Furthermore, the first end portion 50a (or the second end portion 50b) with the protective cap 92 exits from an exit through-hole formed in the bicycle frame body. Since the cord 94 is attached to the through hole 92c of the protective cap 92, the first end portion 50a (or the second end portion 50b) with the protective cap 92 can be easily pulled out from the interior of the bicycle frame body through the exit through-hole of the bicycle frame body by hooking the cord 94 through the exit through-hole of the bicycle frame body with a hooking tool.

Figure 15:
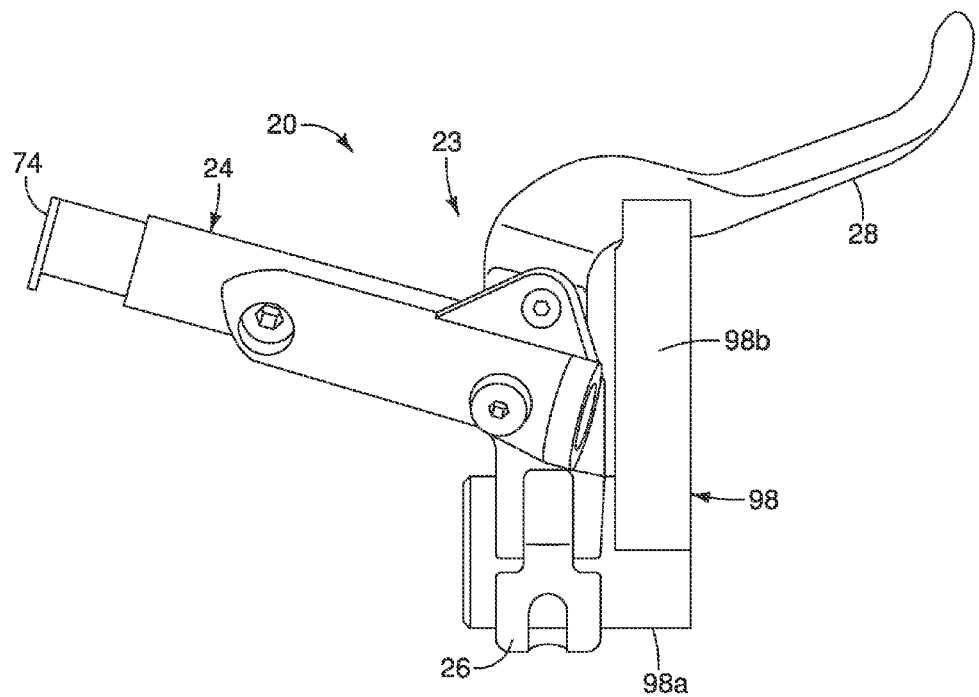
FIG. 15 is a top plan view of the brake operating mechanism illustrated in FIG. 1, with a lever stopper coupled to the brake operating mechanism.
Figure 16:
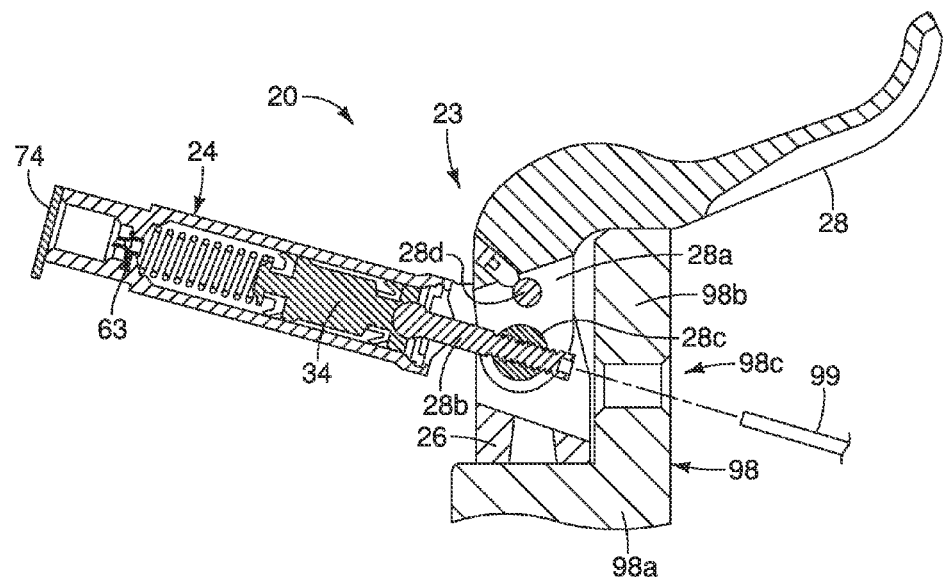
FIG. 16 is a partial cross-sectional view of the brake operating mechanism illustrated in FIG. 15, with the lever stopper coupled to the brake operating mechanism.
Figure 17:
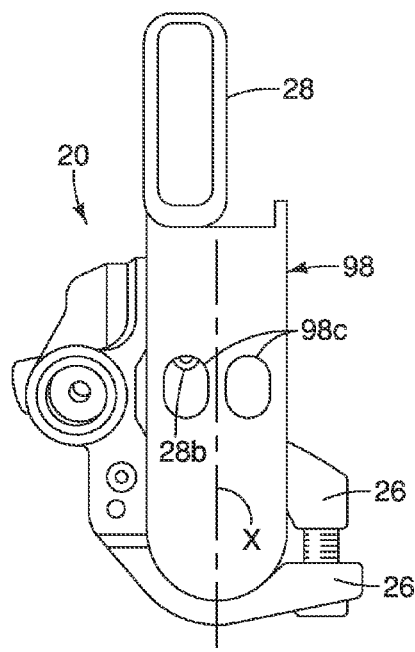
FIG. 17 is a side view of the brake operating mechanism illustrated in FIG. 15, with the lever stopper coupled to the brake operating mechanism.

Referring to FIGS. 15 to 17, a lever stopper 98 (e.g., a lever retaining tool) for retaining a position of brake lever 28 relative to the brake housing 23 will be described. The lever stopper 98 is removably arranged relative to the brake housing 23 and the brake lever 28 (e.g., an operating lever) to prevent the brake lever 28 from moving relative to the brake housing 23. Specifically, the lever stopper 98 is arranged such that the brake lever 28 is prevented from moving from a rest position of the brake lever 28 toward a brake operating position of the brake lever 28 during shipment of the brake operating mechanism 20.

As seen in FIG. 16, the brake lever 28 has a coupling portion 28a, a push rod 28b, a connecting member 28c, and a pivot axle 28d. The brake lever 28 is pivotally coupled to the brake housing 23 about the pivot axle 28d. The connecting member 28c is rotatable relative to the coupling portion 28a. The brake lever 28 is connected to the piston 34 by coupling portion 28a, the coupling the push rod 28b and the connecting member 28c. Specifically, in response to gripping the brake lever 28, the coupling portion 28a pivots about the pivot axle 28d, which also pushes the push rod 28b via the connecting member 28c. The push rod 28b is adjustably connected to the brake lever 28 by the connecting member 28c with a threaded hole. The push rod 28b is threaded into the threaded hole of the connecting member 28c. One end of the push rod 28b is provided with a socket for inserting an adjusting tool 99 therein, while the other end of the push rod 28b is engaged with the piston 34. By rotating the push rod 28b with the adjusting tool 99, the reach between the brake lever 28 and a handlebar 30 (see FIG. 1) can be adjusted. When the brake lever 28 pivots from the rest position towards the brake operating position, the push rod 28b pushes the piston 34 to presses hydraulic fluid in the master cylinder 24.

The lever stopper 98 has a rod shaped mounting part 98a and a retaining part 98b with a pair of access windows 98c. The lever stopper 98 is constructed of a resin material such as a plastic. Of course, any suitable rigid material can be utilized for the lever stopper 98 as needed and/or desired. The lever stopper 98 is formed of a pin that operatively connects the brake housing 23 and the brake lever 28. In particular, the mounting part 98a is dimensioned such that the mounting part 98a is fitted to the clamp 26. The retaining part 98b extends from the mounting part 98a. The retaining part 98b has a receiving surface that receives the brake lever 28 while the mounting part 98a is coupled to the clamp 26, which restricts movement of the brake lever 28 relative to the clamp 26 of the brake housing 23. In particular, when the lever stopper 98 is attached to the brake operating mechanism 20, the reach between the brake lever 28 and the clamp 26 can be adjusted by rotating the push rod 28b through one of the access windows 98c (left side access window 98c in FIG. 17) with the adjusting tool 99. In particular, the reach can be adjusted such that the brake lever 28 contacts with the receiving surface of the retaining part 98b while the brake lever 28 is at the rest position. For example, the reach is adjusted to 90 mm. As a result, the lever stopper 98 prevents the brake lever 28 from moving relative to the brake housing 23 while the lever stopper 98 is attached to the brake operating mechanism 20.

As seen in FIG. 15, the brake operating mechanism 20 is prefilled with hydraulic fluid and sealed with the third sealing material 74 for shipment (see also FIG. 5). With the lever stopper 98, the third sealing material 74 is prevented from being ruptured during shipment due to hydraulic pressure created in response to movement of the brake lever 28 relative to the brake housing 23, thereby preventing oil leakage from the brake operating mechanism 20 during shipment.

As seen in FIGS. 15 to 17, the lever stopper 98 is attached to a right-hand side brake operating mechanism 20. On the other hand, the lever stopper 98 can also be attached to a left-hand side brake operating mechanism. Specifically, the lever stopper 98 is symmetrically formed with respect to a center axis X of the retaining part 98b. When the lever stopper 98 is attached to the left-hand side brake operating mechanism 20, the reach between the brake lever 28 and the clamp 26 can be also adjusted by rotating the push rod 28b through the other of the access windows 98c (right side access window 98c in FIG. 17) with the adjusting tool 99. As a result, the lever stopper 98 prevents the brake lever 28 from moving relative to the brake housing 23 while the lever stopper 98 is attached to the brake operating mechanism 20.

Figure 18:
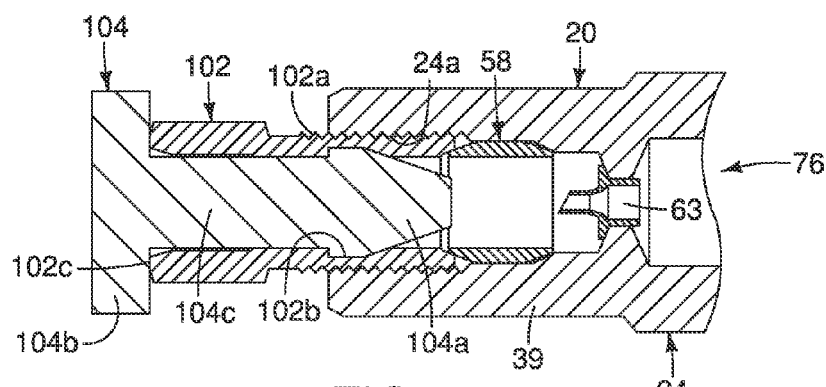
FIG. 18 is an enlarged, partial cross-sectional view of the brake operating mechanism illustrated in FIGS. 1 and 2, with the hose attachment bore of the brake operating mechanism sealed with a sealing plug.
Figure 19:
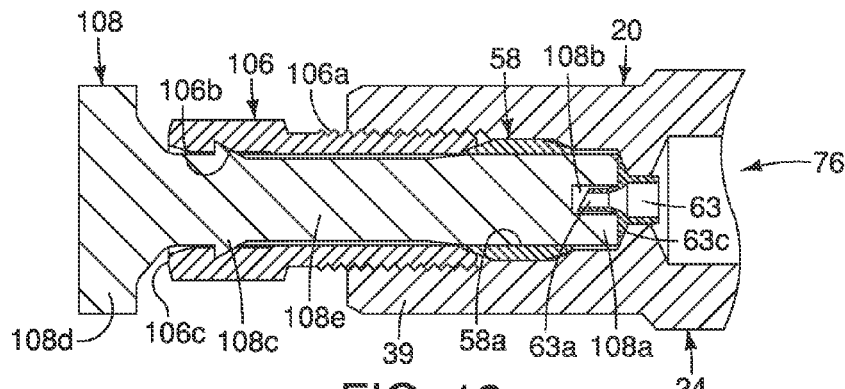
FIG. 19 is an enlarged, partial cross-sectional view of the brake operating mechanism illustrated in FIGS. 1 and 2, with the hose attachment bore of the brake operating mechanism sealed with a modified sealing plug.

Referring to FIGS. 18 and 19, modified sealing materials (i.e., modified sealing materials or plugs 104 and 108) for sealing the hydraulic fluid retaining area 76 of the master cylinder 24 will be described. As seen in FIG. 5, the master cylinder 24 is prefilled with hydraulic fluid and sealed with the strippable third sealing material 74. On the other hand, the sealing of the master cylinder 24 can be performed in different manners as illustrated in FIGS. 18 and 19. In view of the similarity between the example illustrated in FIG. 5 and the modified examples illustrated in FIGS. 18 and 19, the parts of the modified examples that are identical to the parts of the illustrated example illustrated in FIG. 5 will be given the same reference numerals as the parts of the illustrated example illustrated in FIG. 5. Moreover, the descriptions of the parts of the modified examples that are identical to the parts of the illustrated example in FIG. 5 may be omitted for the sake of brevity. While, in FIGS. 18 and 19, the modified sealing plugs 104 and 108 are illustrated as being coupled to the master cylinder 24, these modified sealing plugs 104 and 108 can also be used with the caliper 22.

As seen in FIG. 18, the master cylinder 24 is prefilled with hydraulic fluid and sealed at an end by the sealing material or plug 104 (e.g., a first seal or a third seal). Specifically, the sealing plug 104 forms a detachable plug detachably coupled to a modified threaded fastening sleeve or fitting 102. The sealing plug 104 has an enlarged head portion 104a, a flange portion 104b, and a body portion 104c extends between the enlarged head portion 104a and the flange portion 104b. The sealing plug 104 is fitted to an interior bore of the threaded fitting 102. The sealing plug 104 is integrally formed as a one-piece, unitary member. The sealing plug 104 is made of an elastic material, such as rubber. Of course, any suitable material can be utilized for the sealing plug 104 as needed and/or desired. The threaded fitting 102 is identical to the first threaded fitting 54 illustrated in FIG. 5, excepting that the threaded fitting 102 has an annular recess 102b on the interior bore of the threaded fitting 102.

When providing the master cylinder 24 filled with hydraulic fluid, the rupturing insert 63, the first tubular bushing 58 and the threaded fitting 102 are assembled to the master cylinder 24 in a manner described through reference to FIGS. 7 to 9. In particular, a threaded portion 102a of the threaded fitting 102 is threaded to the internal threaded bore 24a of the master cylinder 24. Furthermore, the sealing plug 104 is fitted to the interior bore of the threaded fitting 102 such that the enlarged head portion 104a is engaged with the annular recess 102b, which prevents an axial movement of the sealing plug 104. The body portion 104c has a larger diameter than the interior bore of the threaded fitting 102. Thus, when the sealing plug 104 is inserted into the interior bore of the threaded fitting 102, the opening of the threaded fitting 102 is radially sealed with the body portion 104c of the sealing plug 104. The flange portion 104b has a larger diameter than an outer periphery of the threaded fitting 102. The sealing plug 104 is inserted into the interior bore of the threaded fitting 102 until the flange portion 104b contacts with an annular end face 102c of the threaded fitting 102. After the sealing plug 104 is coupled to the threaded fitting 102, the hydraulic fluid retaining area 76 of the master cylinder 24 is filled with hydraulic fluid.

Furthermore, when the master cylinder 24 is hydraulically connected to the hydraulic brake hose structure 14 (see FIG. 2A), the sealing plug 104 is removed from the threaded fitting 102, and the first end portion 50a of the flexible tube 50 is attached to the hose attachment section 39 of the master cylinder 24 though the threaded fitting 102 and the first tubular bushing 58. The sealing plug 104 is removed from the threaded fitting 102 by merely being pulled out from the threaded fitting 102. The flange portion 104b can be held while removing the sealing plug 104 from the threaded fitting 102. Of course, the sealing plug 104 can be removed by a removal tool having constructions similar to corkscrews.

As seen in FIG. 19, the master cylinder 24 is prefilled with hydraulic fluid and sealed at an end by the sealing material or plug 108 (e.g., a first seal or a third seal). Specifically, the sealing plug 108 forms a detachable plug detachably coupled to a modified threaded fastening sleeve or fitting 106. The sealing plug 108 has a head portion 108a with a socket hole 108b, an engagement flange 108c, and a flange portion 108d. The engagement flange 108c is formed around a body portion 108e extends between the head portion 108a and the flange portion 108d. The sealing plug 108 is fitted to an interior bore of the threaded fitting 106. The sealing plug 108 is integrally formed as a one-piece, unitary member. The sealing plug 108 is made of an elastic material, such as rubber. Of course, any suitable material can be utilized for the sealing plug 108 as needed and/or desired. The threaded fitting 106 is identical to the first threaded fitting 54 illustrated in FIG. 5, excepting that the threaded fitting 106 has an annular recess 106b on the interior bore of the threaded fitting 106.

When providing the master cylinder 24 filled with hydraulic fluid, the rupturing insert 63, the first tubular bushing 58 and the threaded fitting 106 are assembled to the master cylinder 24 in a manner described through reference to FIGS. 7 to 9. In particular, a threaded portion 106a of the threaded fitting 106 is threaded to the internal threaded bore 24a of the master cylinder 24. Furthermore, the sealing plug 108 is fitted to the interior bore of the threaded fitting 106 such that the engagement flange 108c is engaged with the annular recess 106b of the threaded fitting 106, which prevents an axial movement of the sealing plug 108. The body portion 108e has a longer length than the axial dimension between the annular end face 106c of the threaded fitting 106 and the annular flange section 63b of the rupturing insert 63. Thus, when the engagement flange 108c is engaged with the annular recess 106b, the head portion 108a axially contacts with the annular flange section 63b of the rupturing insert 63 such that the socket hole 108b of the head portion 108a accommodates the end section 63a of the rupturing insert 63. Thus, the hydraulic fluid retaining area 76 extending through the rupturing insert 63 is axially blocked with an axial interface between the head portion 108a of the sealing plug 108 and the flange section 63b of the rupturing insert 63. Furthermore, when the engagement flange 108c is engaged with the annular recess 106b of the threaded fitting 106, the engagement flange 108c is radially deformed by the annular recess 106b. This creates a radial sealing between the interior bore of the threaded fitting 106 and the sealing plug 108. Furthermore, when the engagement flange 108c is engaged with the annular recess 106b, the head portion 108a axially contacts with the annular flange section 63b of the rupturing insert 63, which also radially deforms the body portion 108e of the sealing plug 108. As a result, when the sealing plug 108 is inserted into the interior bore of the threaded fitting 106, the opening of the threaded fitting 106 is radially sealed with the body portion 108e of the sealing plug 108. Accordingly, with the sealing plug 108, the hydraulic fluid retaining area 76 of the master cylinder 24 is securely sealed. After the sealing plug 108 is coupled to the threaded fitting 106, the hydraulic fluid retaining area 76 of the master cylinder 24 is filled with hydraulic fluid.

Furthermore, when the master cylinder 24 is hydraulically connected to the hydraulic brake hose structure 14 (see FIG. 2A), the sealing plug 108 is removed from the threaded fitting 106, and the first end portion 50a of the flexible tube 50 is attached to the hose attachment section 39 of the master cylinder 24 though the threaded fitting 106 and the first tubular bushing 58. The sealing plug 108 is removed from the threaded fitting 106 by merely being pulled out from the threaded fitting 106. The flange portion 108d can be held while removing the sealing plug 108 from the threaded fitting 102. Of course, the sealing plug 108 can be removed by a removal tool having constructions similar to corkscrews.

Figure 20:
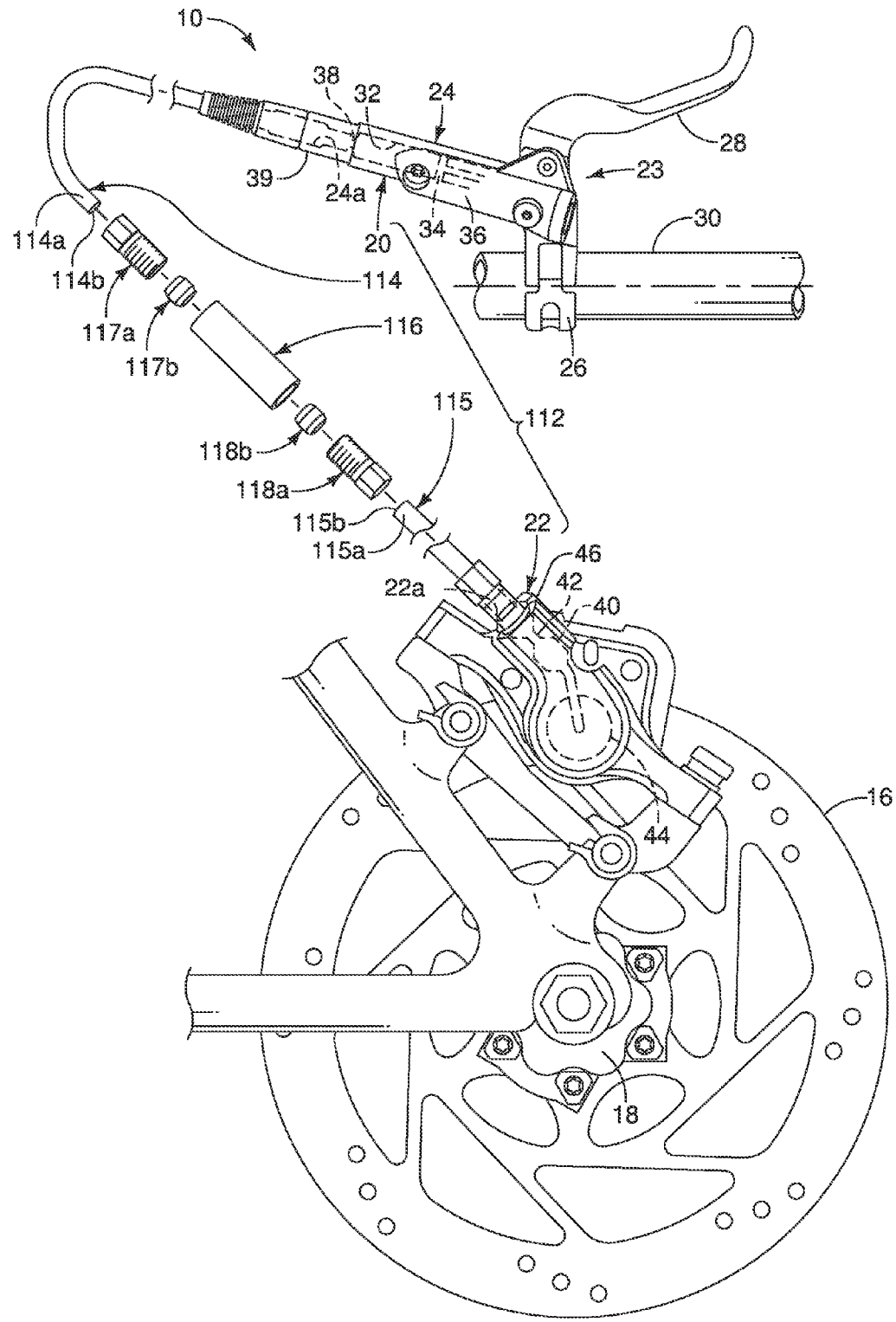
FIG. 20 is a side elevational view of a disc brake assembly using a hydraulic brake system in accordance with a modified example, with a pair of hydraulic brake hose structures of the brake operating mechanism and the brake caliper coupled to each other via a hydraulic hose coupler.
Figure 21:
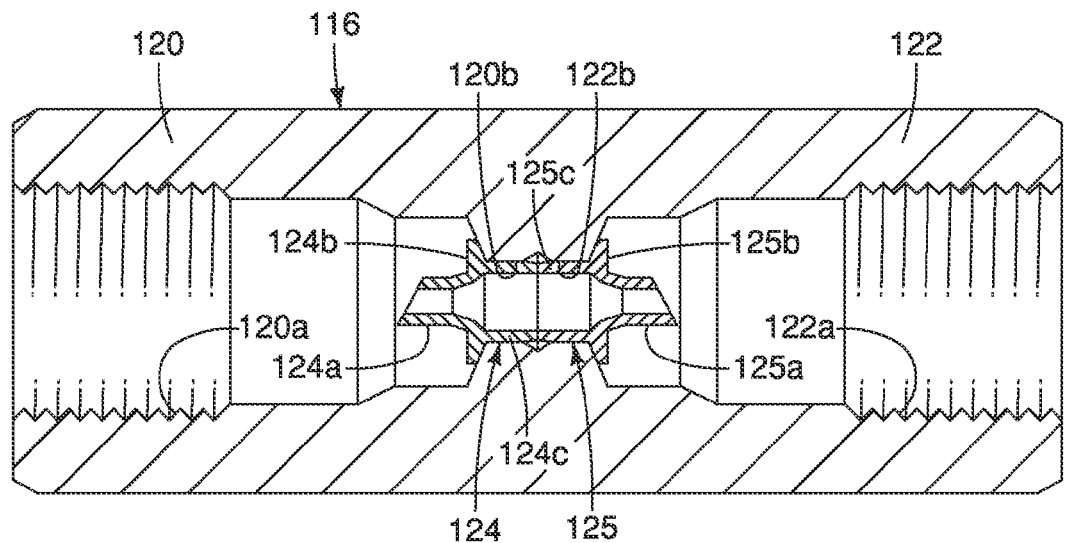
FIG. 21 is a cross-sectional view of the hydraulic hose coupler illustrated in FIG. 20.

Referring to FIGS. 20 and 21, a modified hydraulic brake hose structure for fluidly connecting the brake operating mechanism 20 and the caliper 22 will be described. As seen in FIG. 1, the brake operating mechanism 20 and the caliper 22 is hydraulically connected with a single hydraulic brake hose structure 14 that is integrally formed as a one-piece member. On the other hand, the brake operating mechanism 20 and the caliper 22 can be hydraulically connected in a different manner as illustrated in FIGS. 20 and 21. In view of the similarity between the example illustrated in FIG. 1 and the modified example illustrated in FIGS. 20 and 21, the parts of the modified example that are identical to the parts of the illustrated example illustrated in FIG. 1 will be given the same reference numerals as the parts of the illustrated example illustrated in FIG. 1. Moreover, the descriptions of the parts of the modified example that are identical to the parts of the illustrated example in FIG. 1 may be omitted for the sake of brevity. While, in FIGS. 20 and 21, the modified hydraulic connection is illustrated as being used in the disc brake assembly 10, the modified hydraulic connection can also be used in the front disc brake assembly.

As seen in FIG. 20, the brake operating mechanism 20 and the caliper 22 are hydraulically connected to each other via a pair of first and second hydraulic brake hose structures 114 and 115 that are coupled together with a hydraulic hose coupler 116. The first and second hydraulic brake hose structures 114 and 115 are independently formed as separate members and are hydraulically connected to each other with the hydraulic hose coupler 116. The total lengths of the first and second hydraulic brake hose structures 114 and 115 are almost equal to the length of the hydraulic brake hose structure 14 illustrated in FIG. 1.

The first hydraulic brake hose structure 114 is hydraulically connected to the brake operating mechanism 20. In particular, one end of the first hydraulic brake hose structure 114 is fixedly coupled to the master cylinder 24 in a manner illustrated in FIG. 2A, or in a well known conventional manner. The other end portion 114a of the first hydraulic brake hose structure 114 has an identical construction to the first and second end portions 50a and 50b of the hydraulic brake hose structure 14 illustrated in FIGS. 3 and 4. Specifically, the end portion 114a of the first hydraulic brake hose structure 114 is sealed with a sealing material 114b. The sealing material 114b is formed of a thin flexible sheet of metal foil. The sealing material 114b is adhesively attached to the end portion 114a to seal an opening of the end portion 114a of the first hydraulic brake hose structure 114. With this connection of the brake operating mechanism 20 and the first hydraulic brake hose structure 114, these component forms a single hydraulic fluid path of a single hydraulic component that continuously extends from the master cylinder 24 (e.g., a hydraulic component body) to the first hydraulic brake hose structure 114 (e.g., a hydraulic hose). The master cylinder 24 is operatively joined with one end of the first hydraulic brake hose structure 114. The end of this hydraulic path is defined by the end portion 114a of the first hydraulic brake hose structure 114. This single hydraulic fluid path of the hydraulic component (i.e., a combination of the brake operating mechanism 20 and the first hydraulic brake hose structure 114) is sealed with the sealing material 114b, and prefilled with hydraulic fluid. Thus, the brake operating mechanism 20 and the first hydraulic brake hose structure 114 can be treated as a single hydraulic component while shipping. In other words, the brake operating mechanism 20 and the first hydraulic brake hose structure 114 form a hydraulic component having fluid path filled with hydraulic fluid. The sealing material 114b forms a rupturable first seal arranged to seal an end of the fluid path of the hydraulic component.

The second hydraulic brake hose structure 115 is hydraulically connected to the caliper 22. In particular, one end of the second hydraulic brake hose structure 115 is fixedly coupled to the caliper 22 in a manner illustrated in FIG. 2A, or in a well-known conventional manner. The other end portion 115a of the second hydraulic brake hose structure 115 has an identical construction to the first and second end portions 50a and 50b of the hydraulic brake hose structure 14 illustrated in FIGS. 3 and 4. Specifically, the end portion 115a of the second hydraulic brake hose structure 115 is sealed with a sealing material 115b. The sealing material 115b is formed of a thin flexible sheet of metal foil. The sealing material 115b is adhesively attached to the end portion 115a to seal an opening of the end portion 115a of the second hydraulic brake hose structure 115. With this connection of the caliper 22 and the second hydraulic brake hose structure 115, these component forms a single hydraulic fluid path of a single hydraulic component that continuously extends from the caliper 22 (e.g., a hydraulic component body) to the second hydraulic brake hose structure 115 (e.g., a hydraulic hose). The caliper 22 is operatively joined with one end of the second hydraulic brake hose structure 115. The end of this hydraulic path is defined by the end portion 115a of the second hydraulic brake hose structure 115. This single hydraulic fluid path of the hydraulic component (i.e., a combination of the caliper 22 and the second hydraulic brake hose structure 115) is sealed with the sealing material 115b, and prefilled with hydraulic fluid. Thus, the caliper 22 and the second hydraulic brake hose structure 115 can be treated as a single hydraulic component while shipping. In other words, the caliper 22 and the second hydraulic brake hose structure 115 form a hydraulic component having fluid path filled with hydraulic fluid. The sealing material 115b forms a rupturable first seal arranged to seal an end of the fluid path of the hydraulic component.

The brake operating mechanism 20 and the caliper 22 are hydraulically connected to each other via the hydraulic hose coupler 116. Specifically, the brake operating mechanism 20 and the caliper 22 are hydraulically connected to each other by hydraulically coupling the first and second hydraulic brake hose structures 114 and 115 to the hydraulic hose coupler 116, respectively. As illustrated in FIG. 21, the hydraulic hose coupler 116 has a coupler body with first and second hose attachment sections 120 and 122 with first and second internal threaded bores 120a and 122a (e.g., first and second attachment bores), respectively. The first and second internal threaded bores 120a and 122a is configured to fluidly communicate with respect to each other via first and second ports 120b and 122b. The hydraulic hose coupler 116 further has first and second tubular rupturing inserts 124 and 125 that are fittedly coupled to the first and second ports 120b and 122b, respectively. Specifically, the first and second rupturing inserts 124 and 125 are disposed in the first and second internal threaded bores 120a and 122a, respectively. The first and second rupturing inserts 124 and 125 are arranged to puncture the sealing materials 114b and 115b of the first and second hydraulic brake hose structures 114 and 115, respectively, to fluidly communicate the first and second hydraulic brake hose structures 114 and 115 relative to each other. The first and second rupturing inserts 124 and 125 are identical to the rupturing insert 63 or the rupturing insert 73 (see FIG. 2A). Specifically, the first rupturing insert 124 has a tubular end section 124a, an annular flange section 124b, and a tubular body section 124c. The second rupturing insert 125 has a tubular end section 125a, an annular flange section 125b, and a tubular body section 125c.

The first hydraulic brake hose structure 114 is coupled to the first hose attachment section 120 of the hydraulic hose coupler 116 with a threaded fastening sleeve or fitting 117a and a tubular bushing 117b. In particular, the threaded fitting 117a is identical to the first threaded fitting 54 or the second threaded fitting 64 (see FIG. 2A). The tubular bushing 117b is identical to the first tubular bushing 58 or the second tubular bushing 68 (see FIG. 2A). The threaded fitting 117a and the tubular bushing 117b overly the end portion 114a of the first hydraulic brake hose structure 114. Then, the end portion 114a with the threaded fitting 117a and the tubular bushing 117b is inserted into the first hose attachment section 120 of the hydraulic hose coupler 116, which ruptures the sealing material 114b with the end section 124a of the first rupturing insert 124. Then, the threaded fitting 117a is threaded to the first internal threaded bore 120a of the hydraulic hose coupler 116, which axially compresses the tubular bushing 117b. As a result, the tubular bushing 117b is deformed so as to squeeze the end portion 114a onto a tubular insert attached to the end portion 114a, thereby coupling the first hydraulic brake hose structure 114 to the first hose attachment section 120 of the hydraulic hose coupler 116. More specifically, the sealed hydraulic fluid path made of the master cylinder 24 and the first hydraulic brake hose structure 114 is fluidly connected to a passageway that extends through the first rupturing insert 124. Thus, the master cylinder 24 and the first hydraulic brake hose structure 114 form a first section defining a first fluid path. The first rupturing insert 124 forms a first seal rupturing structure disposed in the vicinity of the first fluid path. The first rupturing insert 124 physically ruptures the sealing material 114b (e.g., a first seal) of the first hydraulic brake hose structure 114 (e.g., a first hydraulic hose).

Furthermore, the second hydraulic brake hose structure 115 is coupled to the second hose attachment section 122 of the hydraulic hose coupler 116 with a threaded fastening sleeve or fitting 118a and a tubular bushing 118b. In particular, the threaded fitting 118a is identical to the first threaded fitting 54 or the second threaded fitting 64 (see FIG. 2A). The tubular bushing 118b is identical to the first tubular bushing 58 or the second tubular bushing 68 (see FIG. 2A). The threaded fitting 118a and the tubular bushing 118b overly the end portion 115a of the second hydraulic brake hose structure 115. Then, the end portion 115a with the threaded fitting 118a and the tubular bushing 118b is inserted into the second hose attachment section 122 of the hydraulic hose coupler 116, which ruptures the sealing material 115b with the end section 125a of the second rupturing insert 125. Then, the threaded fitting 118a is threaded to the second internal threaded bore 122a of the hydraulic hose coupler 116, which axially compresses the tubular bushing 118b. As a result, the tubular bushing 118b is deformed so as to squeeze the end portion 115a onto a tubular insert attached to the end portion 115a, thereby coupling the second hydraulic brake hose structure 115 to the second hose attachment section 122 of the hydraulic hose coupler 116. More specifically, the sealed hydraulic fluid path made of the caliper 22 and the second hydraulic brake hose structure 115 is fluidly connected to a passageway that extends through the second rupturing insert 125. Thus, the caliper 22 and the second hydraulic brake hose structure 115 form a second section defining a second fluid path. The second rupturing insert 125 forms a second seal rupturing structure disposed in the vicinity of the second fluid path. The second rupturing insert 125 physically ruptures the sealing material 115b (e.g., a second seal) of the second hydraulic brake hose structure 115 (e.g., a second hydraulic hose).

As a result, the brake operating mechanism 20 and the caliper 22 are hydraulically connected to each other via the first and second hydraulic brake hose structures 114 and 115 that are hydraulically coupled together with the hydraulic hose coupler 116. In particular, the brake operating mechanism 20 with the first hydraulic brake hose structure 114 (e.g., a hydraulic component) is operatively connected to the caliper 22 with the second hydraulic brake hose structure 115 (e.g., an additional hydraulic component). With this arrangement, the hydraulic hose coupler 116 can be disposed within an interior of a bicycle frame body when the first and second hydraulic brake hose structures 114 and 115 extends within the interior of the bicycle frame body.

Furthermore, the hydraulic hose coupler 116 can be prefilled with hydraulic fluid prior to connecting the first and second hydraulic brake hose structures 114 and 115 to the hydraulic hose coupler 116. In this case, prior to coupling the first hydraulic brake hose structure 114 to the first hose attachment section 120 of the hydraulic hose coupler 116, the threaded fitting 117a and the tubular bushing 117b are fastened to the first hose attachment section 120 of the hydraulic hose coupler 116 in a manner described with reference to FIGS. 8 and 9. Furthermore, an annular end face of the threaded fitting 117a is sealed with a sealing material in a manner described with reference to FIG. 10. Furthermore, prior to coupling the second hydraulic brake hose structure 115 to the second hose attachment section 122 of the hydraulic hose coupler 116, the threaded fitting 118a and the tubular bushing 118b are fastened to the second hose attachment section 122 of the hydraulic hose coupler 116 in a manner described with reference to FIGS. 8 and 9. Furthermore, a hydraulic fluid retaining area of the hydraulic hose coupler 116 defined by the first and second internal threaded bores 120a and 122a and the passageways that extend through the first and second rupturing inserts 124 and 125 is filled with hydraulic fluid. Then, an annular end face of the threaded fitting 118a is sealed with a sealing material in a manner described with reference to FIG. 10.

With this prefilled hydraulic hose coupler 116, when the first hydraulic brake hose structure 114 is coupled to the hydraulic hose coupler 116, the sealing material attached to the threaded fitting 117a is removed, and the end portion 114a of the first hydraulic brake hose structure 114 is inserted through the threaded fitting 117a and the tubular bushing 117b, which ruptures the sealing material 114b of the first hydraulic brake hose structure 114 with the first rupturing insert 124. As a result, the first hydraulic brake hose structure 114 and the master cylinder 24 are hydraulically connected to the hydraulic fluid retaining area of the hydraulic hose coupler 116. Furthermore, when the second hydraulic brake hose structure 115 is coupled to the hydraulic hose coupler 116, the sealing material attached to the threaded fitting 118a is removed, and the end portion 115a of the second hydraulic brake hose structure 115 is inserted through the threaded fitting 118a and the tubular bushing 118b, which ruptures the sealing material 115b of the second hydraulic brake hose structure 115 with the second rupturing insert 125. As a result, the second hydraulic brake hose structure 115 and the caliper 22 are hydraulically connected to the hydraulic fluid retaining area of the hydraulic hose coupler 116, which also connects the master cylinder 24 and the caliper 22 relative to each other.

As seen in FIG. 20, the first and second hydraulic brake hose structures 114 and 115 are hydraulically connected to each other with the hydraulic hose coupler 116. On the other hand, the hydraulic component formed of the brake operating mechanism 20 and the first hydraulic brake hose structure 114 illustrated in FIG. 20 can be directly coupled to the caliper 22 (e.g., an additional hydraulic component). In particular, the end portion 114a of the first hydraulic brake hose structure 114 can be directly coupled to the hose attachment section 46 of the caliper 22, and the sealing material 114b of the first hydraulic brake hose structure 114 is physically ruptured by the rupturing insert 73 of the caliper 22. In this case, the first hydraulic brake hose structure 114 has a length that is equal to the hydraulic brake hose structure 14 illustrated in FIG. 3, and the caliper 22 has the constructions illustrated in FIG. 6. Alternatively, the hydraulic component formed of the caliper 22 and the second hydraulic brake hose structure 115 illustrated in FIG. 20 can be directly coupled to the brake operating mechanism 20 (e.g., an additional hydraulic component). In particular, the end portion 115a of the second hydraulic brake hose structure 115 can be directly coupled to the hose attachment section 39 of the master cylinder 24, and the sealing material 115b of the second hydraulic brake hose structure 115 is physically ruptured by the rupturing insert 63 of the master cylinder 24. In this case, the second hydraulic brake hose structure 115 has a length that is equal to the hydraulic brake hose structure 14 illustrated in FIG. 3, and the master cylinder 24 of the brake operating mechanism 20 has the constructions illustrated in FIG. 5.

Figure 22:
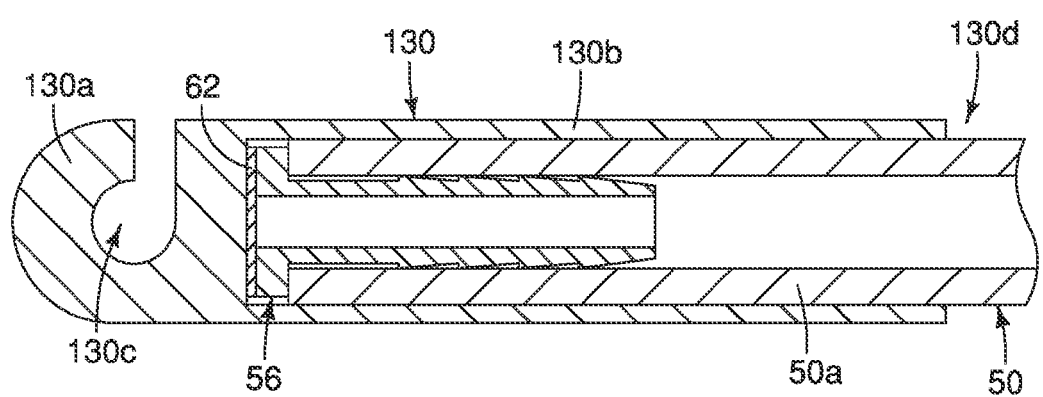
FIG. 22 is a partial cross-sectional view of the hydraulic brake hose structure with a modified protective cap coupled to one end of the hydraulic brake hose structure.

Referring to FIG. 22, a modified protective or protection cap 130 (e.g., a first protective cap) for protecting the seals (e.g., first and second seal) of the hydraulic brake hose structure 14 will be described. The protective cap 130 has a hooked head portion 130a (e.g., a hook portion) with a convex or spherical outer surface and a bottomed cylindrical portion 130b arranged with respect to the hooked head portion 130a. The protective cap 130 is identical to the protective cap 92 illustrated in FIGS. 12 to 14, except for the construction of the hooked head portion 130a. The protective cap 130 is arranged to protect the first end portion 50a that is sealed by the first sealing material 62. Of course, the protective cap 130 can also be used for the second end portion 50b that is sealed by the second sealing material 72. Since the constructions of the first and second end portions 50a and 50b are identical to each other, the detailed description of the protective cap 130 used for the second end portion 50b will be omitted for the sake of brevity.

The protective cap 130 is removably attached to the first end portion 50a such that the protective cap 130 accommodates the first end portion 50a, the first tubular insert 56 and the first sealing material 62 therein. The protective cap 130 is constructed of a resin material such as a plastic, or an elastic material such as a rubber, such that the first end portion 50a of the flexible tube 50, which is made of a rubber, is fittedly coupled to the protective cap 130. Of course, any suitable material can be utilized for the protective cap 130 as needed and/or desired. The hooked head portion 130a forms a distal end of the protective cap 130. The hooked head portion 130a has a traverse through opening 130c that radially extends through the hooked head portion 130a. The cylindrical portion 130b defines a cylindrical inner face or bore 130d within which the first end portion 50a of the flexible tube 50 with the first sealing material 62 is disposed. The protective cap 130 is integrally formed as a one-piece, unitary member.

As seen in FIG. 3, the hydraulic brake hose structure 14 is prefilled with hydraulic fluid and sealed for shipment. With the protective cap 130, the first and second sealing materials 62 and 72 is prevented from being ruptured during shipment due to contacting with external objects, thereby preventing oil leakage from the hydraulic brake hose structure 14 during shipment. Furthermore, with the protective cap 130, the first and second sealing materials 62 and 72 are prevented from being ruptured during installation of the hydraulic brake hose structure 14 through an interior of a bicycle frame body (not shown). Specifically, while installing the hydraulic brake hose structure 14 to the bicycle frame body, the first end portion 50a (or the second end portion 50b) with the protective cap 130 is introduced into the interior of the bicycle frame body via an entrance through-hole formed in the bicycle frame body. Then, the first end portion 50a (or the second end portion 50b) with the protective cap 130 is guided along an interior surface of the bicycle frame body. Since the hooked head portion 130a of the protective cap 130 has the convex or spherical outer surface, the first end portion 50a (or the second end portion 50b) with the protective cap 130 can be smoothly guided along the interior surface of the bicycle frame body during the installation. Furthermore, with the protective cap 130, the first sealing material 62 (or the second sealing material 72) is prevented from being ruptured due to contacting interior objects within the bicycle frame body, thereby preventing oil leakage from the hydraulic brake hose structure 14 during the installation. Furthermore, the first end portion 50a (or the second end portion 50b) with the protective cap 130 exits from an exit through-hole formed in the bicycle frame body. Since the protective cap 130 has the hooked head portion 130a, the first end portion 50a (or the second end portion 50b) with the protective cap 130 can be easily pulled out from the interior of the bicycle frame body through the exit through-hole of the bicycle frame body by hooking the hooked head portion 130a with a hooking tool, such as a ring cord.

Referring to FIGS. 23 to 27, a wedge-type lever stopper 132 (e.g., a lever retaining tool) for retaining a position of the brake lever 28 relative to the brake housing 23 will be described. The lever stopper 98 described through reference to FIGS. 15 to 17 is operatively disposed between the brake lever 28 and the clamp 26. On the other hand, the lever stopper 132 is removably arranged relative to the master cylinder 24 and the brake lever 28 (e.g., an operating lever) to prevent the brake lever 28 from moving relative to the brake housing 23. Specifically, the lever stopper 132 is arranged such that the brake lever 28 is prevented from moving from a rest position of the brake lever 28 toward a brake operating position of the brake lever 28 during shipment of the brake operating mechanism 20. The construction of the brake lever 28 is described above through reference to FIG. 16. Thus, the detailed description of the brake lever 28 will be omitted for the sake of brevity.

The lever stopper 132 has a stopper body 134 and a pair of wedge legs 136 that extends from the stopper body 134. The stopper body 134 and the wedge legs 136 are integrally formed as a one-piece, unitary member. The lever stopper 132 is constructed of a resin material such as plastic, or an elastic material such as rubber. Of course, any suitable material can be utilized for the lever stopper 132 as needed and/or desired. The lever stopper 132 is formed of a wedge. The lever stopper 132 is driven in the vicinity of the pivot axle 28d of the brake lever 28, and in the vicinity of the piston 34. In particular, the lever stopper 132 is sandwiched between a contact end face 24b of the master cylinder 24 and an outer periphery 28e of the coupling portion 28a of the brake lever 28 while the lever stopper 132 is attached to the brake operating mechanism 20. More specifically, the lever stopper 132 has a cylinder contact surface 132a on one side of the lever stopper 132, and a lever contact surface 132b on the opposite side of the lever stopper 132. The cylinder contact surface 132a contacts with the contact end face 24b of the master cylinder 24, while the lever contact surface 132b contacts with the outer periphery 28e of the brake lever 28. Specifically, the lever contact surface 132b further has a pair of contact sections 136a on the wedge legs 136, respectively. The contact sections 136a have an outer profile that corresponds to the outer periphery 28e of the coupling portion 28a. The wedge legs 136 have a thickness that decreases as approaching towards distal ends of the wedge legs 136, respectively. More specifically, the wedge legs 136 is dimensioned such that the wedge legs 136 have a thickness that corresponding to the distance between the contact end face 24b of the master cylinder 24 and the outer periphery 28e of the brake lever 28 while the brake lever 28 is located at the rest position. The wedge legs 136 are spaced apart from each other.

Figure 26:
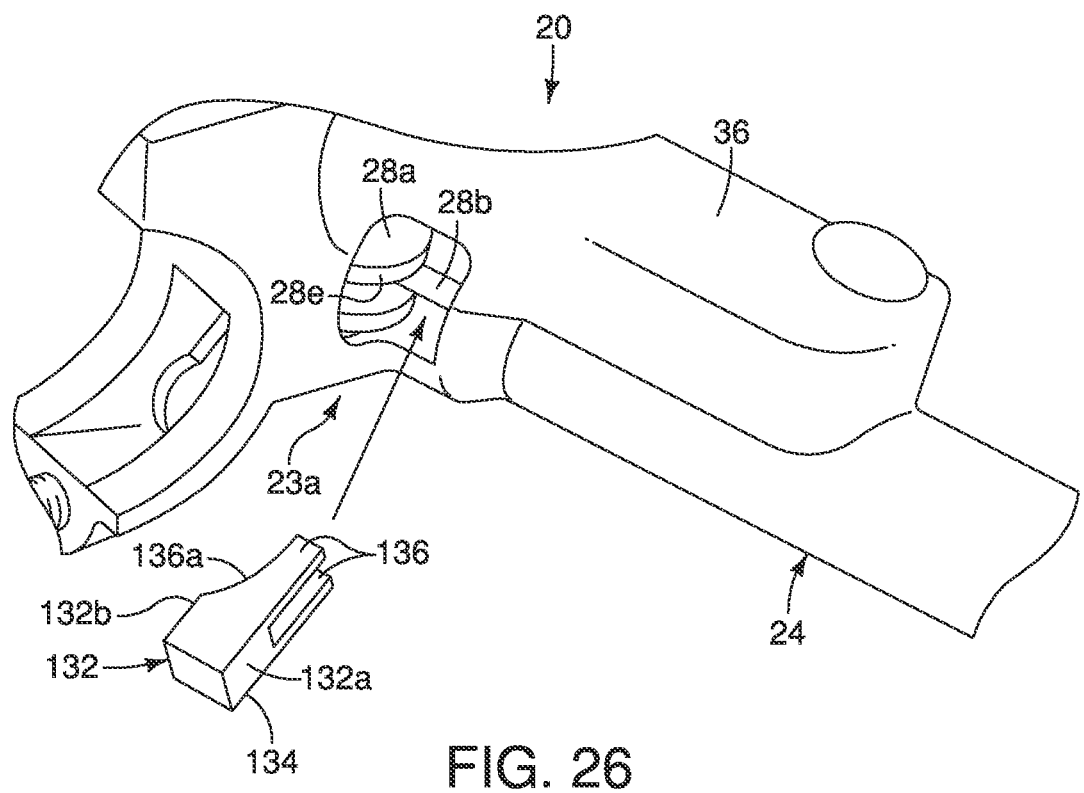
FIG. 26 is an enlarged, partial perspective view of the brake operating mechanism illustrated in FIG. 23, illustrating assembly of the modified lever stopper illustrated in FIGS. 24 and 25 to the brake operating mechanism.
Figure 27:
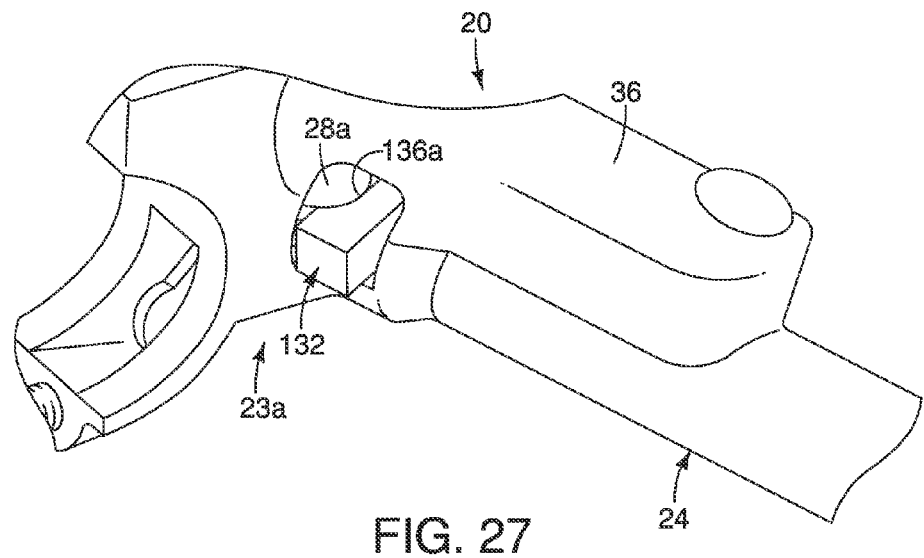
FIG. 27 is an enlarged, partial perspective view of the brake operating mechanism illustrated in FIG. 23, illustrating assembly of the modified lever stopper illustrated in FIGS. 24 and 25 to the brake operating mechanism.

As seen in FIGS. 26 and 27, the lever stopper 132 is inserted through an access window 23a of the brake housing 23 such that the push rod 28b is disposed between the wedge legs 136. Then, the lever stopper 132 is pressed until a pair of latching bulges 136b formed on inner opposing faces of the wedge legs 136, respectively, are engaged with the push rod 28b, thereby preventing the lever stopper 132 from accidentally coming off the brake operating mechanism 20. Furthermore, in this state, the lever stopper 132 is fittedly wedged between the contact end face 24b of the master cylinder 24 and the outer periphery 28e of the coupling portion 28a of the brake lever 28, which restricts pivotal movement of the coupling portion 28a of the brake lever 28 about the pivot axle 28d relative to the master cylinder 24. In particular, when the lever stopper 132 is attached to the brake operating mechanism 20, the reach between the brake lever 28 and the clamp 26 can be adjusted by rotating the push rod 28b with the adjusting tool 99 (see FIG. 16). In particular, the reach can be adjusted such that the lever stopper 132 is fittedly wedged between the contact end face 24b of the master cylinder 24 and the outer periphery 28e of the coupling portion 28a of the brake lever 28 while the brake lever 28 is at the rest position. As a result, the lever stopper 132 prevents the brake lever 28 from moving relative to the brake housing 23 while the lever stopper 132 is attached to the brake operating mechanism 20.

As seen in FIG. 5, the brake operating mechanism 20 is prefilled with hydraulic fluid and sealed with the third sealing material 74 for shipment. With the lever stopper 132, the third sealing material 74 is prevented from being ruptured during shipment due to hydraulic pressure created in response to movement of the brake lever 28 relative to the brake housing 23, thereby preventing oil leakage from the brake operating mechanism 20 during shipment.

Figure 23:
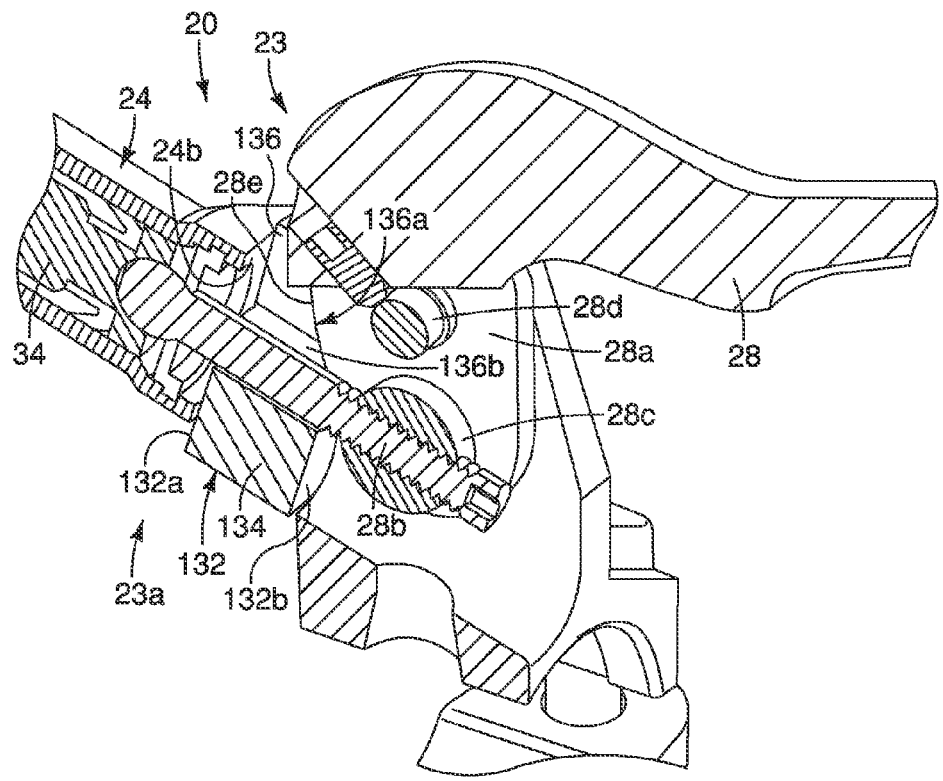
FIG. 23 is an enlarged, partial cross-sectional view of the brake operating mechanism illustrated in FIGS. 1 and 2, with a modified lever stopper coupled to the brake operating mechanism.
Figure 24:
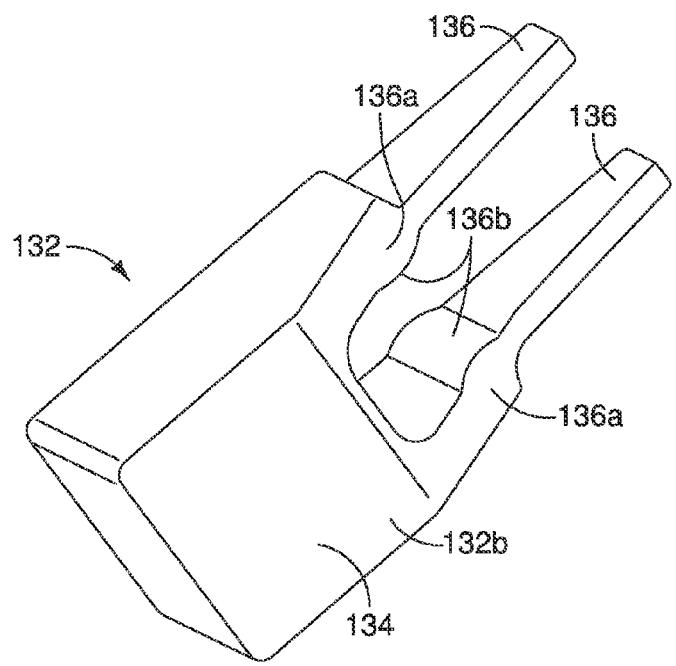
FIG. 24 is a perspective view of the modified lever stopper illustrated in FIG. 23.
Figure 25:
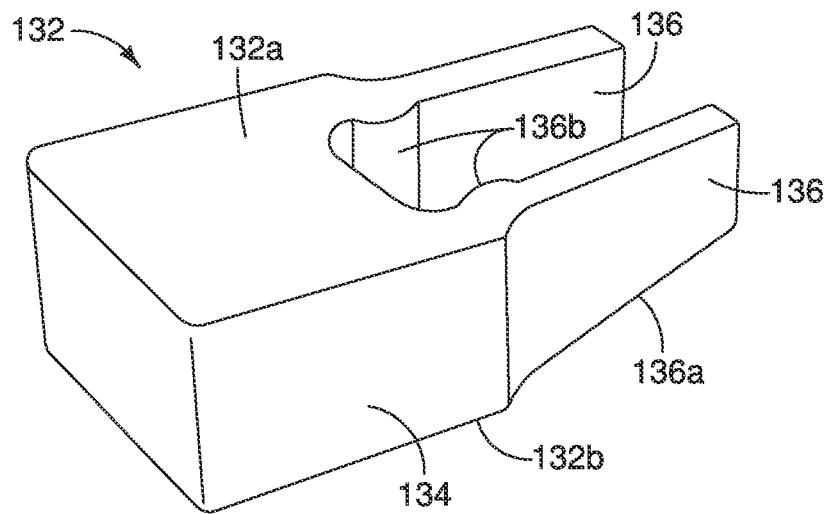
FIG. 25 is a perspective view of the modified lever stopper illustrated in FIG. 23.

As seen in FIG. 23, the lever stopper 132 is attached to a right-hand side brake operating mechanism 20. On the other hand, the lever stopper 132 can also be attached to a left-hand side brake operating mechanism in a manner described above.

Figure 28:
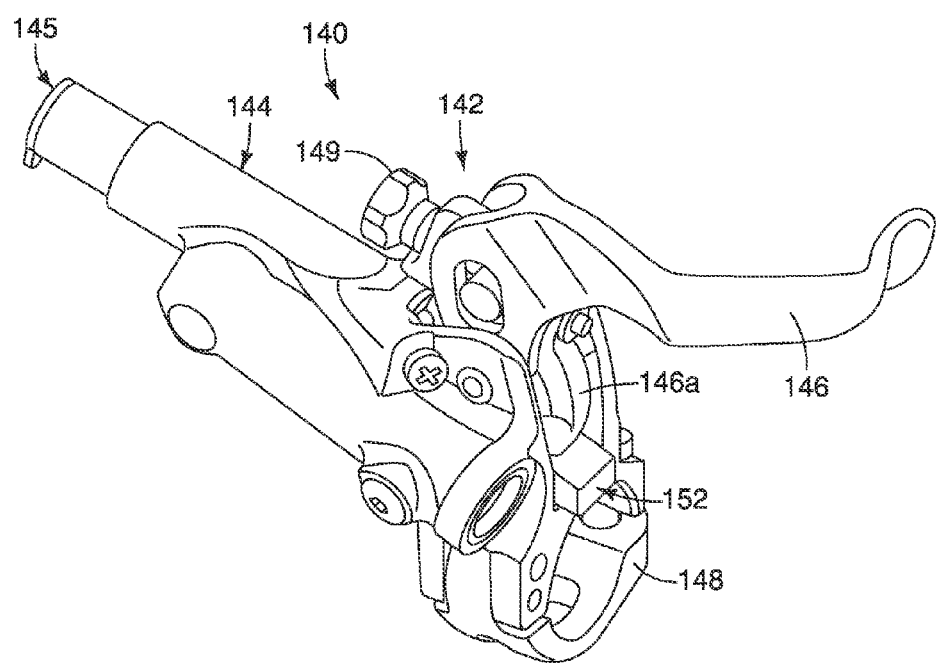
FIG. 28 is a perspective view of a brake operating mechanism in accordance with a modified example, with a modified lever stopper coupled to the brake operating mechanism.
Figure 29:
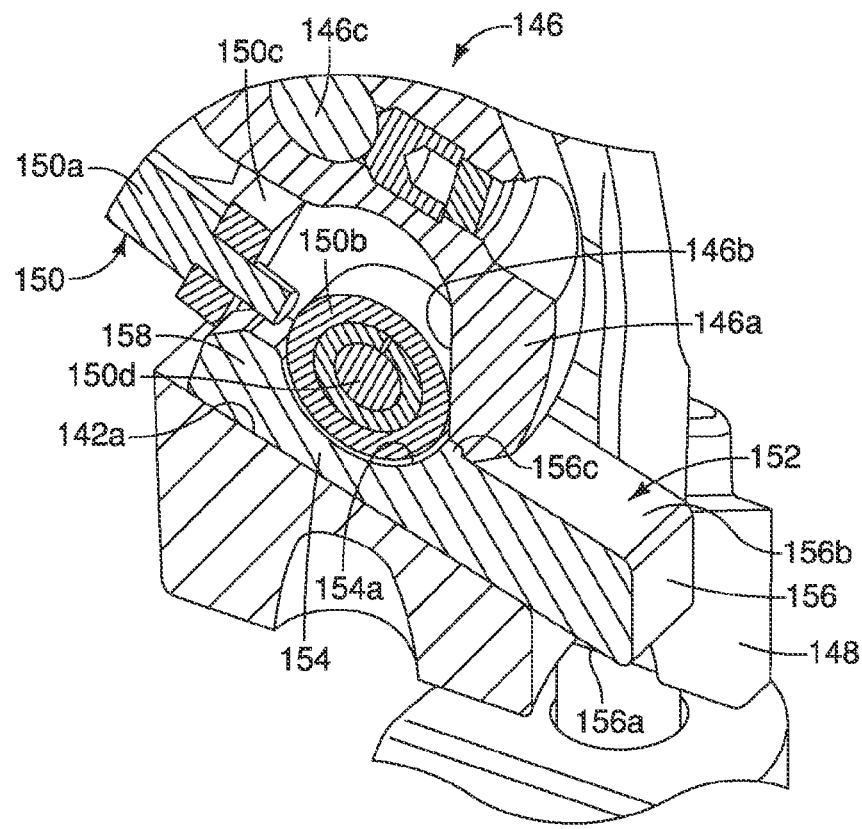
FIG. 29 is an enlarged, partial cross-sectional view of the brake operating mechanism illustrated in FIG. 28, with the modified lever stopper coupled to the brake operating mechanism.
Figure 30:
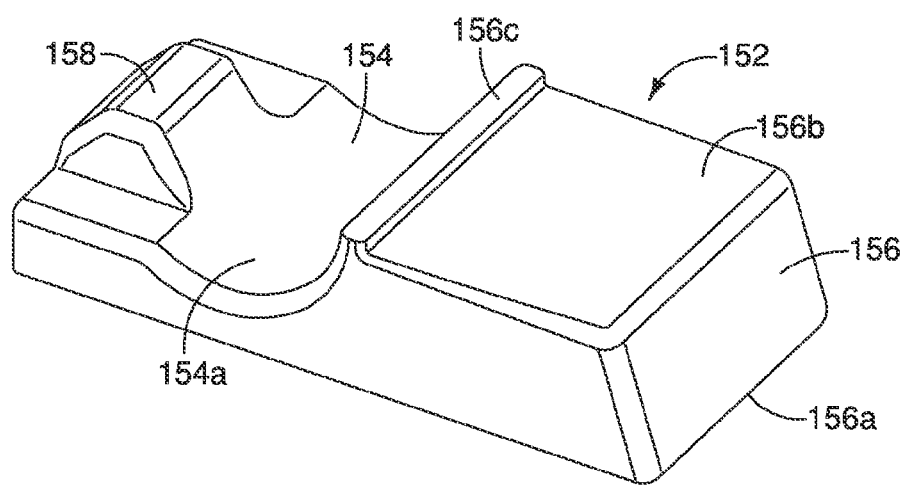
FIG. 30 is a perspective view of the modified lever stopper illustrated in FIGS. 28 and 29.

Referring to FIGS. 28 to 30, a modified wedge-type lever stopper 152 (e.g., a lever retaining tool) will be described. The lever stopper 132 described through reference to FIGS. 23 to 27 is removably arranged relative to the master cylinder 24 and the brake lever 28. On the other hand, the lever stopper 152 is used with a different type of brake operating mechanisms different from the brake operating mechanism 20 in a different manner. Specifically, the lever stopper 152 is used with a brake operating mechanism 140. The brake operating mechanism 140 is used in the hydraulic brake system 12 illustrated in FIG. 1, instead of the brake operating mechanism 20.

As best seen in FIG. 28, the brake operating mechanism 140 basically includes a brake housing 142 with a master cylinder 144, a brake lever 146, and a clamp 148. The master cylinder 144 is prefilled with hydraulic fluid and sealed with a sealing material 145 in a similar manner to the brake operating mechanism 20. In particular, the sealing material 145 is identical to the third sealing material 74 illustrated in FIG. 16, except that the sealing material 145 is attached to the master cylinder 144. The brake lever 146 is pivotally coupled to the brake housing 142 for creating hydraulic pressure in the master cylinder 144. The clamp 148 is integrally formed with the brake housing 142 for supporting the brake operating mechanism 140 relative to the handlebar 30 (see FIG. 1) in a conventional manner. The constructions of the brake operating mechanism 140 can be identical to the constructions of the brake operating mechanism 20 unless otherwise described hereafter. Thus, the details of each of the constructions of the brake operating mechanism 140 will be omitted for the sake of brevity, except for the constructions related to an attachment of the lever stopper 152.

As best seen in FIG. 29, the brake lever 146 has a cam protrusion 146a with a cam surface 146b. The brake lever 146 is pivotally attached to the brake housing 142 for pivotal movement about a pivot pin 146c. The master cylinder 144 is provided with a push rod assembly 150 for reciprocally sliding a piston (not shown) within the master cylinder 144. The push rod assembly 150 has a push rod 150a, a tubular cam roller 150b, and a push rod attachment member 150c. The push rod 150a is fixedly coupled to the push rod attachment member 150c. The cam roller 150b is rotatably attached to the push rod attachment member 150c about a roller axle 150d. The cam surface 146b of the cam protrusion 146a directly contacts with the cam roller 150b while the brake lever 146 is in a rest position. As the brake lever 146 is moved from the rest position of the brake lever 146 toward a brake operating position of the brake lever 146, the cam protrusion 146a pivots about the pivot pin 146c towards an attachment surface 142a of the brake housing 142, which causes the cam roller 150b to rotate and ride along the cam surface 146b. As a result, the cam protrusion 146a of the brake lever 146 pushes the piston via the push rod assembly 150 to create hydraulic pressure in the master cylinder 144. In other words, the brake lever 146 is operatively coupled to the piston for moving the piston between a piston rest position and a piston operating position.

The lever stopper 152 is used with the brake operating mechanism 140 for retaining a position of the brake lever 146 of the brake operating mechanism 140 relative to the brake housing 142. Specifically, the lever stopper 152 is removably arranged relative to the brake housing 142 and the brake lever 146 (e.g., an operating lever) to prevent the brake lever 146 from moving relative to the brake housing 142. More specifically, the lever stopper 152 is arranged such that the brake lever 146 is prevented from moving from the rest position of the brake lever 146 toward the brake operating position of the brake lever 146 during shipment of the brake operating mechanism 140.

The lever stopper 152 is integrally formed as a one-piece, unitary member. The lever stopper 152 is constructed of a resin material such as a plastic, or an elastic material such as rubber. Of course, any suitable material can be utilized for the lever stopper 152 as needed and/or desired. The lever stopper 152 is formed of a wedge. The lever stopper 152 is driven in the vicinity of the pivot pin 146c of the brake lever 146, and in the vicinity of the piston. In particular, the lever stopper 152 is sandwiched or wedged between the attachment surface 142a of the brake housing 142 and the cam protrusion 146a of the brake lever 146 while the lever stopper 152 is attached to the brake operating mechanism 140. The lever stopper 152 has a roller receiving portion 154, a stopper body 156 and an engagement protrusion 158. In particular, as seen in FIG. 29, the roller receiving portion 154 is fittedly disposed between the cam roller 150b and the attachment surface 142a of the brake housing 142. The roller receiving portion 154 has a semi-circular contact surface 154a that corresponds to an outer periphery of the cam roller 150b and contacts with the outer periphery of the cam roller 150b. The roller receiving portion 154 is formed on the stopper body 156. The stopper body 156 is fittedly disposed between the brake housing 142 and the brake lever 146. In particular, the stopper body 156 is fittedly disposed between the attachment surface 142a of the brake housing 142 and a distal end of the cam protrusion 146a of the brake lever 146. Specifically, the stopper body 156 has a lower contact surface 156a and an upper contact surface 156b. The lower contact surface 156a contacts with the attachment surface 142a of the brake housing 142, while the upper contact surface 156b contacts with the distal end of the cam protrusion 146a of the brake lever 146. The stopper body 156 has a thickness between the lower and upper contact surfaces 156a and 156b that corresponds to the distance between the attachment surface 142a of the brake housing 142 and the distal end of the cam protrusion 146a of the brake lever 146 when the brake lever 146 is at the rest position. The stopper body 156 further has a traverse engagement rib 156c formed on the upper contact surface 156b. The engagement rib 156c is engaged with the distal end of the cam protrusion 146a of the brake lever 146 such that the engagement rib 156c prevents the distal end of the cam protrusion 146a from being disengaged with the upper contact surface 156b of the stopper body 156 and wedged between the contact surface 154a of the roller receiving portion 154 and the outer periphery of the cam roller 150b. The engagement protrusion 158 is formed on the stopper body 156. The engagement protrusion 158 is disposed between the outer periphery of the cam roller 150b of the push rod assembly 150 and the push rod attachment member 150c of the push rod assembly 150. The engagement protrusion 158 is engaged with the outer periphery of the cam roller 150b of the push rod assembly 150 and the push rod attachment member 150c of the push rod assembly 150, which prevents the lever stopper 152 from moving with respect to the push rod assembly 150.

As seen in FIG. 29, the lever stopper 152 is pushed and wedged into the gap between the attachment surface 142a of the brake housing 142 and the cam roller 150b of the push rod assembly 150 until the engagement protrusion 158 rides over the cam roller 150b. Specifically, in this state, the engagement protrusion 158 is disposed between the cam roller 150b and the push rod attachment member 150c. Furthermore, the roller receiving portion 154 is disposed between the cam roller 150b and the attachment surface 142a of the brake housing 142. Thus, the lever stopper 152 is prevented from accidentally coming off the brake operating mechanism 140. Furthermore, in this state, the lever stopper 152 is fittedly wedged between the attachment surface 142a of the brake housing 142 and the distal end of the cam protrusion 146a of the brake lever 146, which restricts pivotal movement of the cam protrusion 146a of the brake lever 146 about the pivot pin 146c relative to the brake housing 142. In particular, when the lever stopper 152 is attached to the brake operating mechanism 140, the reach between the brake lever 146 and the clamp 148 can be adjusted by rotating an adjusting knob 149 (see FIG. 28). In particular, the reach can be adjusted such that the lever stopper 152 is fittedly wedged between the attachment surface 142a of the brake housing 142 and the distal end of the cam protrusion 146a of the brake lever 146 while the brake lever 146 is at the rest position. As a result, the lever stopper 152 prevents the brake lever 146 from moving relative to the brake housing 142 while the lever stopper 152 is attached to the brake operating mechanism 140. Moreover, even if a gripping force is accidentally excreted on the brake lever 146, the cam protrusion 146a presses the stopper body 156 such that the lower contact surface 156a of the stopper body 156 is pressed against the attachment surface 142a of the brake housing 142, which in turn increases friction between the lower contact surface 156a of the stopper body 156 and the attachment surface 142a of the brake housing 142. As a result, the lever stopper 152 is further prevented from moving along the brake housing 142. Since the cam roller 150b are engaged with the roller receiving portion 154, the push rod assembly 150 does not move relative to the lever stopper 152. Accordingly, hydraulic pressure is further prevented from being created in the master cylinder 144 even if a gripping force is accidentally excreted on the brake lever 146.

As seen in FIG. 28, the brake operating mechanism 140 is prefilled with hydraulic fluid and sealed with the sealing material 145 for shipment. With the lever stopper 152, the sealing material 145 is prevented from being ruptured during shipment due to hydraulic pressure created in response to movement of the brake lever 146 relative to the brake housing 142, thereby preventing oil leakage from the brake operating mechanism 140 during shipment.

As seen in FIGS. 28 and 29, the lever stopper 152 is attached to a right-hand side brake operating mechanism 140. On the other hand, the lever stopper 152 can also be attached to a left-hand side brake operating mechanism in a manner described above.

Figure 31:
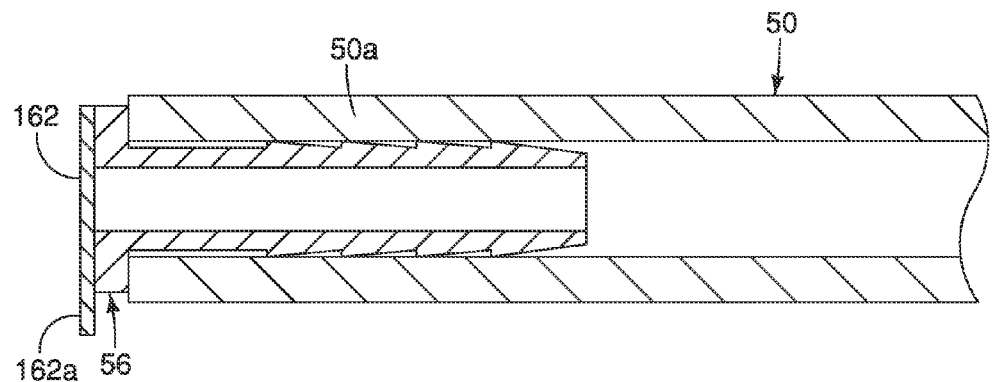
FIG. 31 is a partial cross-sectional view of the hydraulic brake hose structure with a modified sealing material.
Figure 32:
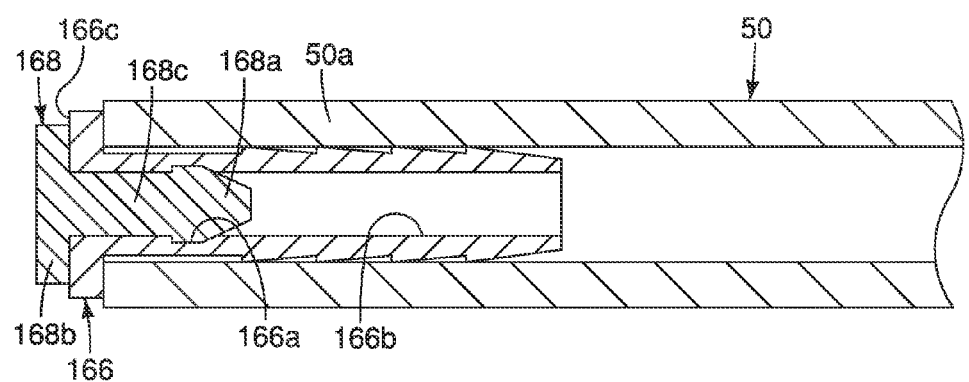
FIG. 32 is a partial cross-sectional view of the hydraulic brake hose structure with a modified sealing plug.

Referring to FIGS. 31 and 32, modified sealing materials (i.e., a sealing material 162 and a sealing material or plug 168) for sealing the opening (e.g., a first opening) of the first end portion 50a of the flexible tube 50 will be described. In other words, the sealing material 162 and the sealing plug 168 form a first detachable seal arranged to seal the first opening of the first end of the hydraulic hose. As seen in FIG. 3, the hydraulic brake hose structure 14 is prefilled with hydraulic fluid and sealed with the rupturable sealing materials (i.e., first and second sealing materials 62 and 72) that are ruptured in response to attachment of the hydraulic brake hose structure to the master cylinder 24 and the caliper 22, respectively. On the other hand, the sealing material 162 and the sealing plug 168 are removably attached to the first end portion 50a of the flexible tube 50. Of course, the sealing material 162 and the sealing plug 168 can be removably attached to the second end portion 50b of the flexible tube 50.

As seen in FIG. 31, the sealing material 162 seals an end opening of the flexible tube 50. Specifically, the sealing material 162 is formed of a thin flexible sheet of metal foil. The sealing material 162 is removably or strippably attached to an annular end face of the first tubular insert 56 to overlie the opening of the flexible tube 50 that is defined by the annular end face of the first tubular insert 56. In other words, the sealing material 162 forms a strippable sheet. The sealing material 162 is thermally bonded to the first tubular insert 56. The sealing material 162 has a stripping tab 162a that is held for removing the sealing material 162 from the first tubular insert 56. The stripping tab 162a extends outward relative to an outer periphery of the first tubular insert 56.

When the flexible tube 50 with the sealing material 162 is hydraulically connected to the master cylinder 24 (see FIG. 2A), the sealing material 162 is first removed or detached from the flexible tube 50 by pulling the stripping tab 162a. Then, the first end portion 50a is inserted into the hose attachment section 39 (see FIG. 2A) of the master cylinder 24. In this case, the master cylinder 24 does not need to have the rupturing insert 63 for rupturing a seal. Furthermore, the sealing material 162 can be used with the first and second hydraulic brake hose structures 114 and 115. In particular, the sealing material 162 can be detachably attached to the end portions 114a and 115a instead of the sealing material 114b and 115b, respectively.

As seen in FIG. 32, the sealing plug 168 seals an end opening of the flexible tube 50. Specifically, the sealing plug 168 is formed of a detachable plug. The sealing plug 168 is made of an elastic material, such as rubber. Of course, any suitable material can be utilized for the sealing plug 168 as needed and/or desired. The sealing plug 168 is integrally formed as a one-piece, unitary member. The sealing plug 168 is removably or detachably attached to a tubular insert 166 to overlie the opening of the flexible tube 50 that is defined by the annular end face of the tubular insert 166. The tubular insert 166 is identical to the first tubular insert 56, except for an annular recess 166a being formed on an interior bore 166b of the tubular insert 166. The sealing plug 168 is pressed into the interior bore 166b of the tubular insert 166.

The sealing plug 168 has an enlarged head portion 168a, a flange portion 168b, and a body portion 168c extends between the enlarged head portion 168a and the flange portion 168b. The sealing plug 168 is fitted to or plugged into the interior bore 166b of the tubular insert 166. Specifically, the sealing plug 168 is fitted to the interior bore 166b of the tubular insert 166 such that the enlarged head portion 168a is engaged with the annular recess 166a, which prevents an axial movement of the sealing plug 168. The body portion 168c has a larger diameter than the interior bore 166b of the tubular insert 166. Thus, when the sealing plug 168 is inserted into the interior bore 166b of the tubular insert 166, the opening of the tubular insert 166 is radially sealed with the body portion 168c of the sealing plug 168. The flange portion 168b has a larger diameter than an outer periphery of the tubular insert 166. The sealing plug 168 is inserted into the interior bore 166b of the tubular insert 166 until the flange portion 168b contacts with an annular end face 166c of the tubular insert 166. After the sealing plug 168 is coupled to tubular insert 166, the flexible tube 50 is filled with hydraulic fluid.

When the flexible tube 50 with the sealing plug 168 is hydraulically connected to the master cylinder 24 (see FIG. 2A), the sealing plug 168 is first removed or detached from the flexible tube 50 by holding the flange portion 168b and pulling the flange portion 168b. Of course, the sealing plug 168 can be removed by a removal tool having constructions similar to corkscrews. Then, the first end portion 50a is inserted into the hose attachment section 39 (see FIG. 2A) of the master cylinder 24. In this case, the master cylinder 24 does not need to have the rupturing insert 63 for rupturing a seal. Furthermore, the sealing plug 168 can be used with the first and second hydraulic brake hose structures 114 and 115. In particular, the sealing plug 168 can be detachably attached to the end portions 114a and 115a instead of the sealing material 114b and 115b, respectively.

Figure 33:
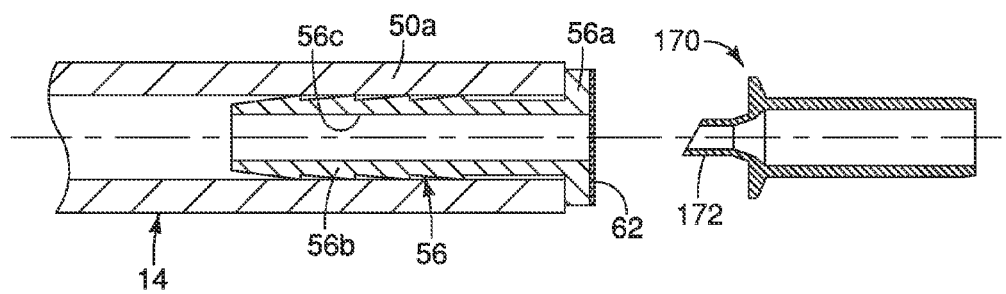
FIG. 33 is a cross-sectional view of a rupturing tool for rupturing the sealing material of the hydraulic brake hose structure.

Referring to FIG. 33, a rupturing or puncturing tool 170 (e.g., a rupturing member) for physically rupturing the first sealing material 62 attached to the first end portion 50a of the hydraulic brake hose structure 14 will be described. Of course, the rupturing tool 170 can be utilized for physically rupturing the second sealing material 72 attached to the second end portion 50b (see FIG. 3) of the hydraulic brake hose structure 14. However, since the constructions of the first and second end portions 50a and 50b are identical to each other, the detailed description of the rupturing tool 170 used for the second end portion 50b will be omitted for the sake of brevity. In the illustrated embodiment illustrated through reference to FIG. 1, the hydraulic brake hose structure 14 is prefilled with hydraulic fluid and sealed with the rupturable sealing materials (i.e., first and second sealing materials 62 and 72) that are ruptured in response to attachment of the hydraulic brake hose structure 14 to the master cylinder 24 and the caliper 22, respectively. On the other hand, with the rupturing tool 170, the sealing materials (i.e., first and second sealing materials 62 and 72) can be physically ruptured before the hydraulic brake hose structure 14 is coupled to the master cylinder 24 and the caliper 22. In other words, with the rupturing tool 170, the first sealing material 62 is physically ruptured in advance.

In particular, the rupturing tool 170 is independently provided from the brake operating mechanism 20, the caliper 22, and the hydraulic brake hose structure 14, and can form a part of the hydraulic brake kit. As seen in FIG. 33, the rupturing tool 170 is basically a tubular member having a tubular end section 172. The end section 172 is formed as a needle for rupturing or puncturing the first sealing material 62 of the hydraulic brake hose structure 14. In particular, the end section 172 has a beveled distal end that punctures the first sealing material 62. The end section 172 of the rupturing tool 170 is inserted into the passageway 56c of the first tubular insert 56, which extends through the flange section 56a and the tubular section 56b, for rupturing the first sealing material 62 before the hydraulic brake hose structure 14 is coupled to the brake operating mechanism 20. In other words, with the rupturing tool 170, the first sealing material 62 is physically ruptured in advance. The end section 172 is dimensioned such that the end section 172 is fittedly inserted into the passageway 56c of the first tubular insert 56.

The rupturing tool 170 is constructed of a resin material such as a plastic. Of course, any suitable rigid material can be utilized for the rupturing tool 170 as needed and/or desired. As seen in FIG. 33, the rupturing tool 170 is basically a tubular member. However, any suitable construction can be utilized for the rupturing tool 170 as needed and/or desired. Specifically, the rupturing tool 170 can be a solid member.

Furthermore, the rupturing tool 170 can also be utilized for physically rupturing the third sealing material 74 (see FIG. 5) when or before the brake operating mechanism 20 is coupled to the first end portion 50a of the hydraulic brake hose structure 14. The rupturing tool 170 can also be utilized for physically rupturing the fourth sealing material 84 (see FIG. 6) when or before the caliper 22 is coupled to the second end portion 50b of the hydraulic brake hose structure 14. Furthermore, the rupturing tool 170 can also be utilized for physically rupturing the sealing materials 114b and 115b of the first and second hydraulic brake hose structures 114 and 115 (FIG.

20) when or before the first and second hydraulic brake hose structures 114 and 115 are coupled to the hydraulic hose coupler 116.

In the illustrated embodiment, the hydraulic brake hose structure 14 forms a hydraulic bicycle hose structure of the present disclosure. However, the construction of the hydraulic brake hose structure 14 can also be applied to hydraulic bicycle hose structures for hydraulically connecting hydraulic shifting systems, or other hydraulic bicycle systems. Furthermore, the brake operating mechanism 20 and the caliper 22 form hydraulic bicycle components of the present disclosure. However, the construction of the brake operating mechanism 20 and the caliper 22 for rupturing seals of hydraulic connections can also be applied to hydraulic bicycle components used with a hydraulic shifting system, a hydraulic suspension adjusting system or other hydraulic bicycle systems.

Figures 34, 35:
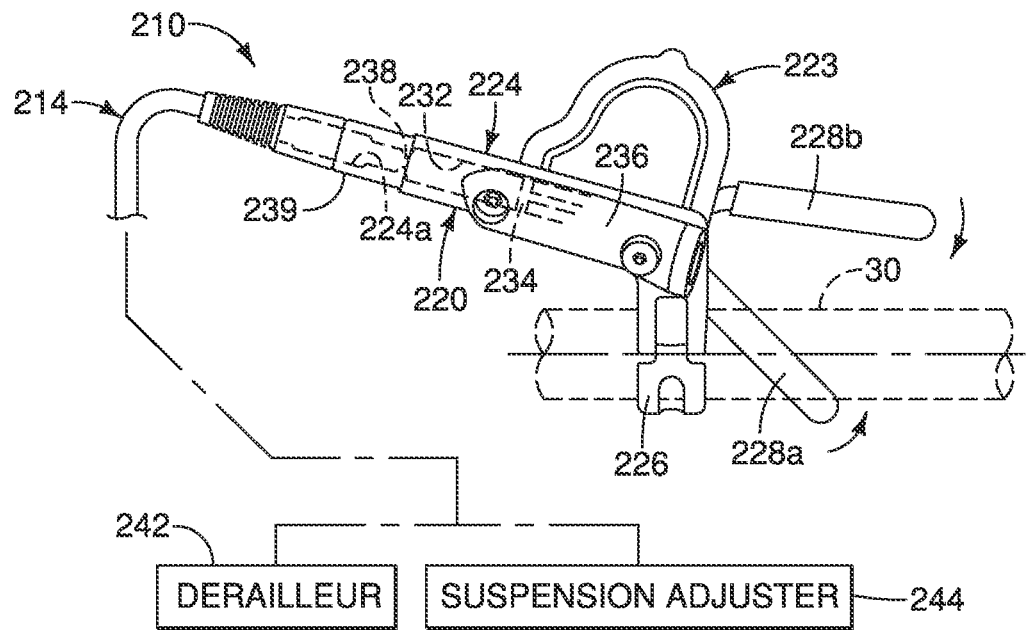
FIG. 34 is a top plan view of a hydraulic operating mechanism in accordance with a modified example of the embodiment.
FIG. 35 is a partial cross-sectional view of the bicycle operating mechanism, with the bicycle operating mechanism coupled to a hydraulic bicycle hose structure.

Referring to FIGS. 34 and 35, a hydraulic bicycle component (i.e., hydraulic operating mechanism 220) used with a hydraulic bicycle system 210 (e.g., a hydraulic shifting system, a hydraulic suspension adjusting system, and so force) will be described. As seen in FIG. 34, the hydraulic operating mechanism 220 is illustrated in the form of a hydraulic derailleur operating (actuation) device (e.g., a shift operation device) or a hydraulic suspension adjusting device (e.g., a suspension control operation device). Since the construction of the hydraulic derailleur operating device or the hydraulic suspension adjusting device is well known (e.g., see U.S. Pat. Nos. 7,509,888 and 7,998,173, for example) except for the construction of a master cylinder 224 of the hydraulic operating mechanism 220, the details of the constructions of the hydraulic operating mechanism 220 will be omitted for the sake of brevity, except for the constructions related to the master cylinder 224.

As diagrammatically illustrated in FIG. 34, the hydraulic operating mechanism 220 operates at least one of a hydraulically operated derailleur 242 and a hydraulically operated suspension adjuster 244. The derailleur 242 and the suspension adjuster 244 are conventional bicycle components (e.g., see U.S. Pat. Nos. 7,509,888 and 7,998,173, for example), and thus, they will not be discussed and/or illustrated herein. Thus, the hydraulic operating mechanism 220 constitutes at least one of a shift operation device and a suspension control operation device.

The hydraulic operating mechanism 220 is hydraulically connected to at least one of the derailleur 242 and the suspension adjuster 244 via a hydraulic bicycle hose structure 214. The hydraulic bicycle hose structure 214 is identical or substantially identical to the hydraulic brake hose structure 14 shown in FIG. 3. In view of the similarity between the hydraulic brake hose structure 14 and the hydraulic bicycle hose structure 214, the parts of the hydraulic bicycle hose structure 214 that are identical to the parts of the hydraulic brake hose structure 14 will be given the same reference numerals but with "200" added thereto, and the detailed description of the hydraulic bicycle hose structure 214 is omitted for the sake of brevity.

As seen in FIGS. 34 and 35, the hydraulic operating mechanism 220 basically has a housing 223 with a master cylinder 224. The hydraulic operating mechanism 220 further has a clamp 226 and first and second levers 228a and 228b (e.g., operating levers). The clamp 226 is integrally formed with the housing 23. The first and second levers 228a and 228b are pivotally coupled to the housing 23. The hydraulic operating mechanism 220 is supported on the handlebar 30 via the clamp 226 in a conventional manner. The first and second levers 228a and 228b are pivotally coupled to the housing 23 for hydraulically operating at least one of the derailleur 242 and the suspension adjuster 244. As best seen in FIG. 34, the hydraulic operating mechanism 220 is illustrated as a double lever indexing type of cable operating device that includes the first lever 228a and the second lever 228b. Operation of the first lever 228a incrementally changes (or increases) hydraulic pressure in the hydraulic bicycle hose structure 214 in a conventional manner, while operation of the second lever 228b decrementally releases (or decreases) the hydraulic pressure in the hydraulic bicycle hose structure 214 in a conventional manner. As a result, the hydraulic operating mechanism 220 operates the derailleur 242 for performing gear shifting operations, or operates the suspension adjuster 24 for shifting between a plurality of suspension settings, such as a rigid suspension setting, a compressible setting, and so forth. In particular, the first and second levers 228a and 228b are operatively connected to a piston 234, which is movably disposed within the master cylinder 224, such that the operations of the first and second levers 228a and 228b move the piston 234 in a stepwise manner. Furthermore, the housing 23 has a conventional gear mechanism (not shown) that retain a position of the piston 234 movably disposed in the master cylinder 224 at a plurality of locations. However, the hydraulic operating mechanism 220 is not limited to this type of hydraulic operating device. Also, the hydraulic operating mechanism 220 can be configured to operate more than one bicycle component.

As seen in FIGS. 34 and 35, the master cylinder 224 defines a master cylinder bore or chamber 232 that has the piston 234 reciprocally mounted in the master cylinder bore 232. The piston 234 is biased with a compression spring disposed within the master cylinder bore 232. The master cylinder 224 also has a hydraulic fluid reservoir 236 that is in fluid communication with the master cylinder bore 232. The hydraulic fluid reservoir 236 contains the hydraulic fluid (e.g., mineral oil) which is pressurized by movement of the piston 234 in the master cylinder bore 232 in response to the pivotal movement of the first and second levers 228a and 228b. In other words, the first and second levers 228a and 228b are operatively coupled to the piston 234 for moving the piston 234 within the master cylinder bore 232 in a stepwise manner. The master cylinder 224 has an outlet port 238 for supplying the hydraulic fluid to at least one of the derailleur 242 and the suspension adjuster 244 via the hydraulic bicycle hose structure 214. Since the operations of the master cylinder 224 and the piston 234 are conventional, these parts will not be discussed or shown in further detail herein. The master cylinder 224 also has a hose attachment section 239 (e.g., an attachment portion) with an internal threaded bore 224a that is fluidly communicated with the master cylinder bore 232 via the outlet port 238. The configurations of the master cylinder 224 are identical or substantially identical to the master cylinder 24 shown in FIG. 1. In view of the similarity between the master cylinder 24 and the master cylinder 224, the parts of the master cylinder 224 that are identical to the parts of the master cylinder 24 will be given the same reference numerals but with "200" added thereto, and the detailed description of the master cylinder 224 is omitted for the sake of brevity.

As best seen in FIG. 35, the master cylinder 224 is further provided with a rupturing insert 263. The rupturing insert 263 is identical or substantially identical to the rupturing insert 63 shown in FIG. 2B. In view of the similarity between the rupturing insert 63 and the rupturing insert 263, the parts of the rupturing insert 263 that are identical to the parts of the rupturing insert 63 will be given the same reference numerals but with "200" added thereto, and the detailed description of the rupturing insert 263 is omitted for the sake of brevity. The rupturing insert 263 has a tubular end section 263a, an annular flange section 263b, and a tubular body section 263c. A longitudinal passageway 263d passes through the end section 263a, the flange section 263b, and the body section 263c. The rupturing insert 263 is coupled to the outlet port 238 of the master cylinder 224 such that the longitudinal passageway 263d is fluidly communicated with the master cylinder bore 232 of the master cylinder 224 to define a fluid path 276 of the master cylinder 224. In other words, the rupturing insert 263 is disposed in the vicinity of the fluid path 276, more specifically, on a leading edge of the fluid path 276 of the master cylinder 224.

The end section 263a is formed as a needle for rupturing or puncturing a sealing material 262 of the hydraulic bicycle hose structure 214. In particular, the end section 263a has a beveled distal end that punctures the sealing material 262 and is inserted into a passageway 256c of a tubular insert 256, which passes through a flange section 256a and a tubular section 256b of the tubular insert 256, in response to an end portion 250a of a flexible tube 250 of the hydraulic bicycle hose structure 214 being coupled to the internal threaded bore 224a of the master cylinder 224. In other words, the end section 263a is dimensioned such that the end section 263a is fittedly inserted into the passageway 256c of the tubular insert 256. The flange section 263b is rested on an annular inner end face of the internal threaded bore 224a of the master cylinder 224. When the end portion 250a of the flexible tube 250 is coupled to the master cylinder 224, the flange section 263b is pushed against the annular inner end face of the internal threaded bore 224a of the master cylinder 224, which securely retains the rupturing insert 263 relative to the outlet port 238. The outer surface of the body section 263c is fitted to the inner surface of the outlet port 238. The body section 263c is designed to be retained in the outlet port 238. The rupturing insert 263 is constructed of a resin material such as a plastic. Of course, any suitable rigid material can be utilized for the rupturing insert 263 as needed and/or desired.

With this hydraulic operating mechanism 220, the sealing material 262 is constructed to be ruptured or punctured with the tubular rupturing insert 263. In particular, the sealing material 262 is physically ruptured by the rupturing insert 263 in response to the end portion 250a of the flexible tube 250 of the hydraulic bicycle hose structure 214 being fully inserted to the hose attachment section 239 of the master cylinder 224.

In the illustrated embodiment, a hydraulic bicycle component system includes a hydraulic component (e.g., a brake operating mechanism 20, a caliper 22, a brake operating mechanism 20 with a first hydraulic brake hose structure 114, or a caliper 22 with a second hydraulic brake hose structure 115) and a first seal (e.g., a third sealing material 74, a fourth sealing material 84, a sealing plug 104, 108 or 168, or a sealing material 114b, 115b or 162). The hydraulic component has a fluid path (e.g., a fluid path 76 or 86) filled with hydraulic fluid. The hydraulic component is configured to be coupled to a hydraulic hose (e.g., a hydraulic brake hose structure 14, a first hydraulic brake hose structure 114, or a second hydraulic brake hose structure 115). The first seal is arranged to seal an end of the fluid path of the hydraulic component.

With this hydraulic bicycle component system, the first seal (e.g., a sealing material 114b or 115b) is configured to be physically ruptured. The first seal is formed of a sheet. The sheet is formed of a foil. The first seal is physically ruptured by a part (e.g., a rupturing insert 63 or 73, a first rupturing insert 124, or a second rupturing insert 125) of an additional hydraulic component (e.g., a brake operating mechanism 20, a caliper 22, or a hydraulic hose coupler 116) when the additional hydraulic component is coupled to the fluid path of the hydraulic component.

With this hydraulic bicycle component system, the first seal (e.g., a third sealing material 74, a fourth sealing material 84, a sealing plug 104, 108 or 168, or a sealing material 162) is detachable with respect to the end of the fluid path of the hydraulic component. The first seal can be a detachable plug (e.g., a sealing plug 104, 108 or 168). The first seal can a strippable sheet (e.g., a third sealing material 74, a fourth sealing material 84, or a sealing material 162). The strippable sheet has a stripping tab (e.g., a stripping tab 74a, 84a or 162a). The first seal is detached from the fluid path of the hydraulic component before an additional hydraulic component (e.g., a brake operating mechanism 20, a caliper 22, or a hydraulic hose coupler 116) is coupled to the end of the fluid path of the hydraulic component.

With this hydraulic bicycle component system, the hydraulic component includes a hydraulic component body (e.g., a brake operating mechanism 20, or a caliper 22) and a hydraulic hose (e.g., a first hydraulic brake hose structure 114, or a second hydraulic brake hose structure 115). The hydraulic component body is operatively joined with one end of the hydraulic hose. The end of the fluid path is defined by the other end of the hydraulic hose.

With this hydraulic bicycle component system, the hydraulic component includes a hydraulic component body (e.g., a brake operating mechanism 20), a piston (e.g., a piston 34) and an operating lever (e.g., a brake lever 28). The hydraulic component body has a housing (e.g., a brake housing 23) that defines an attachment portion (e.g., a hose attachment section 39) and a cylinder bore (e.g., a master cylinder bore 32). The cylinder bore is hydraulically connected to the fluid path of the hydraulic component. The piston is movably arranged within the cylinder bore. The operating lever is pivotally arranged relative to the housing between a rest position and an operating position. The operating lever is operatively coupled to the piston for moving the piston between a piston rest position and a piston operating position. This hydraulic bicycle component system further includes a lever stopper (e.g., a lever stopper 98, 132 or 152) arranged relative to the housing and the operating lever to prevent the operating lever from moving relative to the housing. The lever stopper (e.g., a lever stopper 132 or 152) can be formed of a wedge. The wedge can be driven in the vicinity of a pivot axle (e.g., a pivot axle 28d or a pivot pin 146c) of the operating lever (e.g., a brake lever 28 or 146). The wedge can be driven in the vicinity of the piston. The lever stopper (e.g., a lever stopper 98) can be formed of a pin. The pin connects with the housing and the operating lever.

With this hydraulic bicycle component system, the hydraulic component includes a hydraulic component body (e.g., a brake operating mechanism 20, or a caliper 22) with a hydraulic hose connection end (e.g., a first threaded fitting 54, or a second threaded fitting 64). The fluid path is defined by the hydraulic hose connection end. The hydraulic hose connection end can be sealed by a detachable plug (e.g., a sealing plug 104 or 108). The hydraulic hose connection end can be sealed by a strippable sheet (e.g., a third sealing material 74, or a fourth sealing material 84).

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hydraulic bicycle component system comprising:
a hydraulic component having a fluid path filled with hydraulic fluid, the hydraulic component being configured to be coupled to a hydraulic hose, the hydraulic component including
a hydraulic component body having a hose connection bore opened in an external surface of the hydraulic component body, a chamber disposed inside the hydraulic component body, and a port disposed inside the hydraulic component body between the hose connection bore and the chamber to provide fluid communication between the hose connection bore and the chamber, the hose connection bore, the chamber, and the port forming at least a portion of the fluid path,
a rupturing insert attached to the port, the rupturing insert including a tubular end section, a tubular body section, and an annular flange section disposed between the tubular end section and the tubular body section, the tubular end section protruding into the hose connection bore, the tubular body section being inserted into the port such that the annular flange section abuts against a periphery of the port on the hose connection bore-side of the port,
a connector detachably attached to the hydraulic component body, the connector including a threaded fitting threadedly attached to an internally threaded portion of the hose connection bore and a tabular bushing arranged inside the hose connection bore between the threaded fitting and the rupturing insert; and
a first seal arranged on the threaded fitting of the connector to seal an end of the fluid path of the hydraulic component.

2. The hydraulic bicycle component system according to claim 1, wherein
the first seal is formed of a sheet.

3. The hydraulic bicycle component system according to claim 2, wherein
the sheet is formed of a foil.

4. The hydraulic bicycle component system according to claim 1, wherein
the first seal is detachable with respect to the end of the fluid path of the hydraulic component.

5. The hydraulic bicycle component system according to claim 4, wherein
the first seal is a detachable plug.

6. The hydraulic bicycle component system according to claim 4, wherein
the first seal is a strippable sheet.

7. The hydraulic bicycle component system according to claim 6, wherein
the strippable sheet has a stripping tab.

8. The hydraulic bicycle component system according to claim 4, wherein
the first seal is detached from the fluid path of the hydraulic component before an additional hydraulic component is coupled to the end of the fluid path of the hydraulic component.

9. The hydraulic bicycle component system according to claim 1, wherein
the hydraulic component includes a hydraulic hose, the hydraulic component body being operatively joined with one end of the hydraulic hose, and the end of the fluid path being defined by the other end of the hydraulic hose.

10. The hydraulic bicycle component system according to claim 1, wherein
the hydraulic component body has a housing that defines an attachment portion and the chamber, the chamber being a cylinder bore,
the hydraulic component includes
a piston movably arranged within the cylinder bore, and
an operating lever pivotally arranged relative to the housing between a rest position and an operating position, the operating lever being operatively coupled to the piston for moving the piston between a piston rest position and a piston operating position.

11. The hydraulic bicycle component system according to claim 10, further comprising
a lever stopper arranged relative to the housing and the operating lever to prevent the operating lever from moving relative to the housing.

12. The hydraulic bicycle component system according to claim 11, wherein
the lever stopper is formed of a wedge, the wedge being driven in the vicinity of a pivot axle of the operating lever.

13. The hydraulic bicycle component system according to claim 11, wherein
the lever stopper is formed of a wedge, the wedge being driven in the vicinity of the piston.

14. The hydraulic bicycle component system according to claim 11, wherein
the lever stopper is formed of a pin, the pin connecting with the housing and the operating lever.

15. The hydraulic bicycle component system according to claim 1, wherein
the hydraulic component body has a hydraulic hose connection end, and
the fluid path is defined by the hydraulic hose connection end.

16. The hydraulic bicycle component system according to claim 15, wherein
the hydraulic hose connection end is sealed by a detachable plug.

17. The hydraulic bicycle component system according to claim 15, wherein
the hydraulic hose connection end is sealed by a strippable sheet.

18. A hydraulic bicycle component system comprising:
a hydraulic component having a fluid path filled with hydraulic fluid, the hydraulic component being configured to be coupled to a hydraulic hose, the hydraulic component including
a hydraulic component body having a housing that defines an attachment portion and a cylinder bore, the cylinder bore being hydraulically connected to the fluid path of the hydraulic component,
a piston movably arranged within the cylinder bore, and an operating lever pivotally arranged relative to the housing between a rest position and an operating position, the operating lever being operatively coupled to the piston for moving the piston between a piston rest position and a piston operating position;

a first seal arranged to seal an end of the fluid path of the hydraulic component; and a lever stopper operatively arranged relative to the housing and the operating lever with a portion of the lever stopper arranged to contact the housing and a portion of the lever stopper arranged to contact the operating lever to prevent the operating lever from moving from the rest position relative to the housing such that displacement of piston from the piston rest position toward the piston operating position is prevented.

19. The hydraulic bicycle component system according to claim 1, wherein
the annular flange section of the rupturing insert has an external diameter equal to or smaller than an internal diameter of the hose connection bore.

20. The hydraulic bicycle component system according to claim 1, wherein
a distal end of the tubular end section of the rupturing insert has an obliquely truncated shape such that an end face of the distal end is slanted with respect to a longitudinal axis of the rupturing insert.

21. The hydraulic bicycle component system according to claim 1, wherein
the threaded fitting and the tubular bushing are configured and arranged such that the tubular bushing is compressed axially during installation of the threaded fitting into the internally threaded portion of the hose connection bore, the tubular bushing being deformed as the threaded fitting is tightened.

\* \* \* \* \*